United States Patent
Eryigit et al.

(10) Patent No.: US 11,038,754 B2
(45) Date of Patent: Jun. 15, 2021

(54) CLOUD CONTROLLED MESH NETWORKING

(71) Applicant: Airties Kablosuz Iletisim Sanayi Ve Dis Ticaret A. S., Istanbul (TR)

(72) Inventors: Sefik Salim Eryigit, Istanbul (TR); Muharrem Sarper Gokturk, Istanbul (TR); Bilal Hatipoglu, Istanbul (TR); Metin Ismail Taskin, Istanbul (TR)

(73) Assignee: Airties Kablosuz lletisim Sanayi Ve Dis Ticaret A. S., Istanbul (TR)

( * ) Notice: Subject to any disclaimer, the term of this patent is extended or adjusted under 35 U.S.C. 154(b) by 0 days.

(21) Appl. No.: 15/876,916

(22) Filed: Jan. 22, 2018

(65) Prior Publication Data
US 2018/0212827 A1 Jul. 26, 2018

Related U.S. Application Data

(60) Provisional application No. 62/449,364, filed on Jan. 23, 2017, provisional application No. 62/448,727, filed on Jan. 20, 2017.

(51) Int. Cl.
*H04L 12/24* (2006.01)
*H04W 28/02* (2009.01)
(Continued)

(52) U.S. Cl.
CPC .......... *H04L 41/0823* (2013.01); *H04L 41/14* (2013.01); *H04L 41/142* (2013.01);
(Continued)

(58) Field of Classification Search
CPC . H04L 41/0823; H04L 41/147; H04L 41/145; H04L 41/142; H04L 41/14;
(Continued)

(56) References Cited

U.S. PATENT DOCUMENTS 9,439,197 B1 9/2016 Ngo et al.
2003/0181211 A1* 9/2003 Razavilar .............. H04W 16/10
455/450
(Continued)

FOREIGN PATENT DOCUMENTS

GB 2 545 697 6/2017
WO 14158131 A1 10/2014

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Joshua Kading
(74) *Attorney, Agent, or Firm* — Volpe Koenig

(57) ABSTRACT

Devices, systems, and methods for optimizing a mesh network by cloud computing. A cloud network controller may receive from multiple access points (APs) in a mesh network information related to channel quality based on measurements taken by the APs. Based on this information, the cloud network controller may forecast one or more optimal channels based on the information related to channel quality. The cloud network controller may then send to the multiple APs a message including a recommendation to switch to the one or more optimal channels based on the forecasting. The AP may then make a decision to carry out the recommended channel switch.

14 Claims, 14 Drawing Sheets

(51) Int. Cl.
| | |
|---|---|
| *H04W 36/30* | (2009.01) |
| *H04W 24/02* | (2009.01) |
| *H04W 16/02* | (2009.01) |
| *H04W 16/18* | (2009.01) |
| *H04W 16/22* | (2009.01) |
| *H04W 28/16* | (2009.01) |
| *H04W 72/12* | (2009.01) |
| *H04W 72/08* | (2009.01) |
| *H04W 36/20* | (2009.01) |
| *H04W 36/24* | (2009.01) |
| *H04W 84/18* | (2009.01) |
| *H04W 84/12* | (2009.01) |
| *H04W 16/14* | (2009.01) |

(52) U.S. Cl.
CPC .......... *H04L 41/145* (2013.01); *H04L 41/147* (2013.01); *H04W 16/02* (2013.01); *H04W 16/18* (2013.01); *H04W 16/22* (2013.01); *H04W 24/02* (2013.01); *H04W 28/0205* (2013.01); *H04W 28/0236* (2013.01); *H04W 28/0252* (2013.01); *H04W 28/16* (2013.01); *H04W 36/20* (2013.01); *H04W 36/245* (2013.01); *H04W 36/30* (2013.01); *H04W 72/08* (2013.01); *H04W 72/082* (2013.01); *H04W 72/085* (2013.01); *H04W 72/1231* (2013.01); *H04W 16/14* (2013.01); *H04W 84/12* (2013.01); *H04W 84/18* (2013.01)

(58) Field of Classification Search
CPC .......... H04W 72/082; H04W 72/1231; H04W 72/08; H04W 72/085; H04W 28/16; H04W 28/0252; H04W 28/0236; H04W 28/0205; H04W 16/18; H04W 16/22; H04W 16/02; H04W 16/14; H04W 24/02; H04W 24/10; H04W 84/18
See application file for complete search history.

(56) References Cited

U.S. PATENT DOCUMENTS

| | | | |
|---|---|---|---|
| 2007/0070937 A1* | 3/2007 | Demirhan | H04W 72/06 370/328 |
| 2008/0293353 A1 | 11/2008 | Mody et al. | |
| 2009/0132958 A1* | 5/2009 | Greer | G06F 16/81 715/810 |
| 2009/0149170 A1* | 6/2009 | Kazmi | H04B 17/336 455/422.1 |
| 2010/0130206 A1* | 5/2010 | Chin | H04W 36/30 455/436 |
| 2011/0096739 A1* | 4/2011 | Heidari | H04W 72/085 370/329 |
| 2011/0299422 A1* | 12/2011 | Kim | H04W 48/16 370/253 |
| 2012/0257585 A1 | 10/2012 | Sydor et al. | |
| 2013/0150053 A1 | 6/2013 | Hwang et al. | |
| 2013/0272285 A1* | 10/2013 | Goldsmith | H04W 24/02 370/338 |
| 2015/0305051 A1* | 10/2015 | Xia | H04J 3/1694 370/329 |
| 2016/0021608 A1* | 1/2016 | Lee | H04W 48/18 370/252 |
| 2017/0006479 A1* | 1/2017 | Smith | H04W 24/02 |
| 2017/0215094 A1* | 7/2017 | Akoum | H04L 43/026 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

* cited by examiner

CLOUD CONTROLLED MESH NETWORKING

CROSS REFERENCE TO RELATED APPLICATIONS

This application claims the benefit of U.S. Provisional Application 62/448,727 filed Jan. 20, 2017 and U.S. Provisional 62/449,364 filed Jan. 23, 2017 which are incorporated by reference as if fully set forth.

FIELD OF INVENTION

This disclosure generally relates to wireless networking and more particularly, but not exclusively, to a wireless mesh network where nodes may communicate via different communication standards.

BACKGROUND

In wireless communication a device may access the internet through one or more access points. In some circumstances, the device may interact with a mesh network that may be made of a plurality of access points. There may be a need to address the communication protocols and procedures between these access points in a mesh network to make sure the network is running efficiently and addressing any interference that may exist.

SUMMARY

Devices, systems, and methods for optimizing a mesh network by cloud computing. A cloud network controller may receive from multiple access points (APs) in a mesh network information related to channel quality based on measurements taken by the APs. Based on this information, the cloud network controller may forecast one or more optimal channels based on the information related to channel quality. The cloud network controller my then send to the multiple APs a message including a recommendation to switch to the one or more optimal channels based on the forecasting. The AP may then make a decision to carry out the recommended channel switch.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

The disclosure generally relates to wireless networking and more particularly, but not exclusively, to a wireless mesh network where nodes may communicate via different communication standards such as IEEE 802.11 a/b/g/n/ac/ad/ax. IEEE 802.11 wireless networks may utilize 2.4 GHz and/or 5 GHz unlicensed spectrum bands, also called industry, science and medicine (ISM) bands. Since these spectrum bands are unlicensed, IEEE 802.11 networks, unlike cellular networks such as long term evolution (LTE), may be deployed anywhere without licensing requirements from the governmental institutions. On the other hand, these unlicensed spectrum bands may be crowded and an IEEE 802.11 wireless network may need to coexist and contend with other IEEE 802.11 networks operating in the same band. Moreover, there may be other sources of interference such as microwave ovens, Bluetooth devices, car alarms, video devices, wireless microphones, and other devices or natural phenomenon that operate or occur in these unlicensed spectrum bands.

IEEE 802.11 wireless networks may utilize a channel access mechanism called carrier sense multiple access with collision avoidance (CSMA/CA). To elaborate, any IEEE 802.11 device that accesses the medium for data transmission may listen to the channel for a certain carrier sensing period. The device can only transmit if it deems the medium as idle after listening. On the other hand, if the medium is found to be busy, the device may back off for a certain time after which it checks the medium and performs carrier sensing again. Due to this CSMA/CA protocol, an IEEE 802.11 device contends with not only with devices on the same wireless network but also with other devices on other wireless networks in close proximity operating on the same channel in order to access the mentioned channel. Hence, the probability of accessing the channel decreases with increasing number of devices operating on the same channel in a certain locality.

Given possible interference sources and the CSMA/CA protocol, it is important to assess the quality of the channel on which the network is operating. By measuring the quality of the operating channel, the wireless network may stay on the same channel if it is satisfactory or switches to another channel that may provide better service. Assessing the quality of the operating channel is especially important in IEEE 802.11 wireless mesh networks as the operating channel may be utilized for both client traffic (traffic between a client and its associated access point) and mesh traffic (traffic between access points belonging to the same mesh network).

Figure 1:
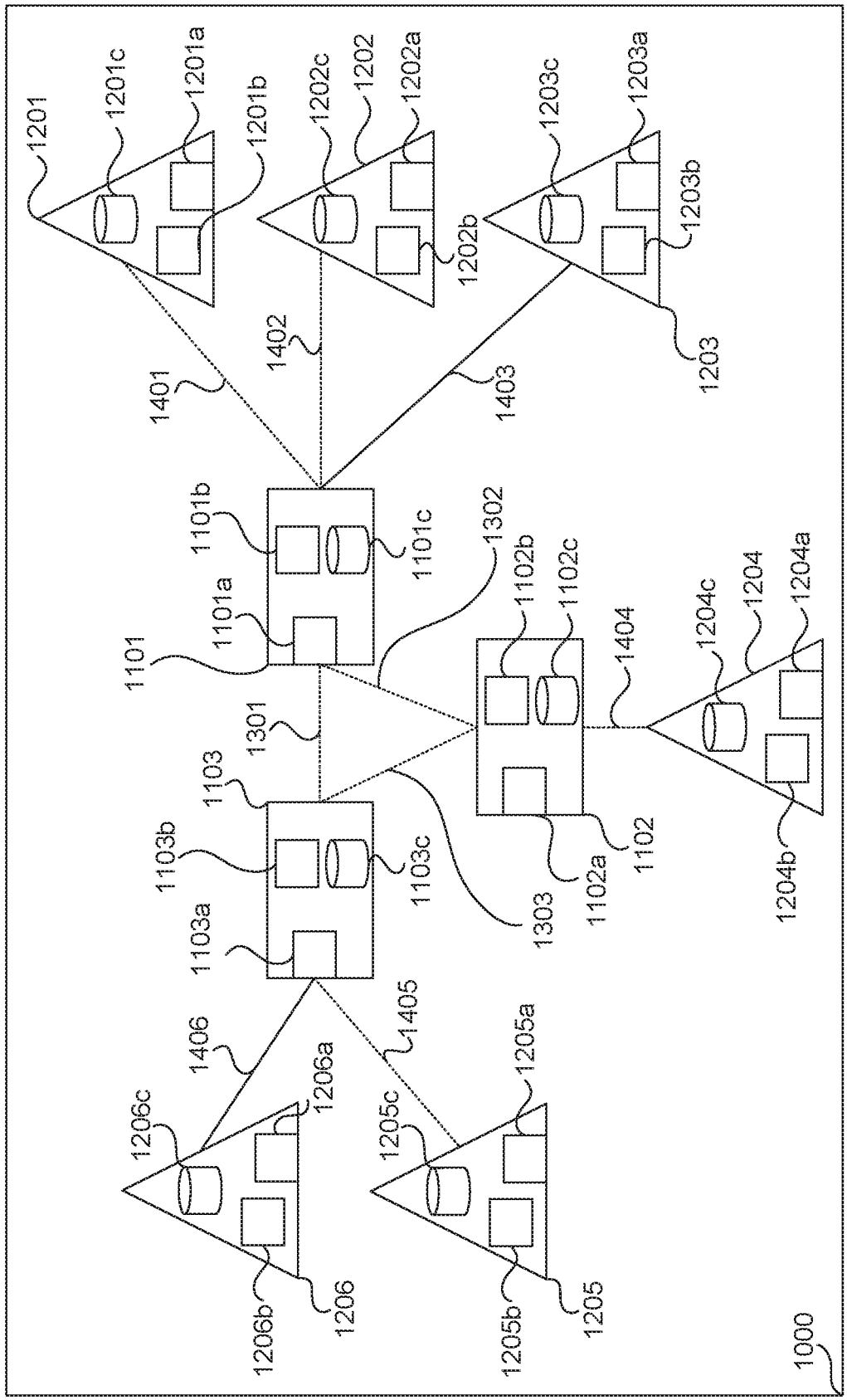
FIG. 1 is a diagram of an example mesh network according to one or more embodiments.

FIG. 1 depicts an example wireless mesh network 1000 that comprises access points and client stations. There are three access points, AP 1101, AP 1102, and AP 1103. Each AP comprises a communication interface (1101a, 1102a, 1103a), a processor (1101b, 1102b, 1103c), and a memory (1101c, 1102c, 1103c). For example, AP 1101 has a communication interface 1101a, a processor 1101b, and a memory 1101c. Access points form a mesh network using a 5 GHz channel as shown in links 1301, 1302, and 1303. A 5 GHz channel is preferable for forming the mesh links compared to a 2.4 GHz channel as there are more channels in the 5 GHz band and they can be combined/bonded to have higher bandwidth channels (up to 160 MHz using IEEE 802.11ac protocol). However, this disclosure is not limited to the 5 GHz channel domain, and may be generalized to other spectrum bands. There are six client stations associated with the access points. Each client station comprises a communication interface (1201a, 1202a, 1203a, 1204a, 1205a, 1206a), a processor (1201b, 1202b, 1203b, 1204b, 1205b, 1206b), and a memory (1201c, 1202c, 1203c, 1204c, 1205c, 1206c). For example, Client 1201 has a communication unit 1201a, a processor 1201b, and a memory 1201c. Clients 1201, 1202 and 1203 are associated with AP 1101. Among these clients 1201 and 1202 utilize 5 GHz links 1401 and 1402, whereas client 1203 uses the 2.4 GHz link 1403. Similarly, client 1204 is associated with AP 1102 using the 5 GHz link 1404. Finally, clients 1205 and 1206 are associated with AP 1103 utilizing 5 GHz link 1405 and 2.4 GHz link 1406, respectively. The clients may be mobile or stationary. They may communicate with access points in order to connect to the Internet via a gateway, which may be one of the access points.

Figure 2:
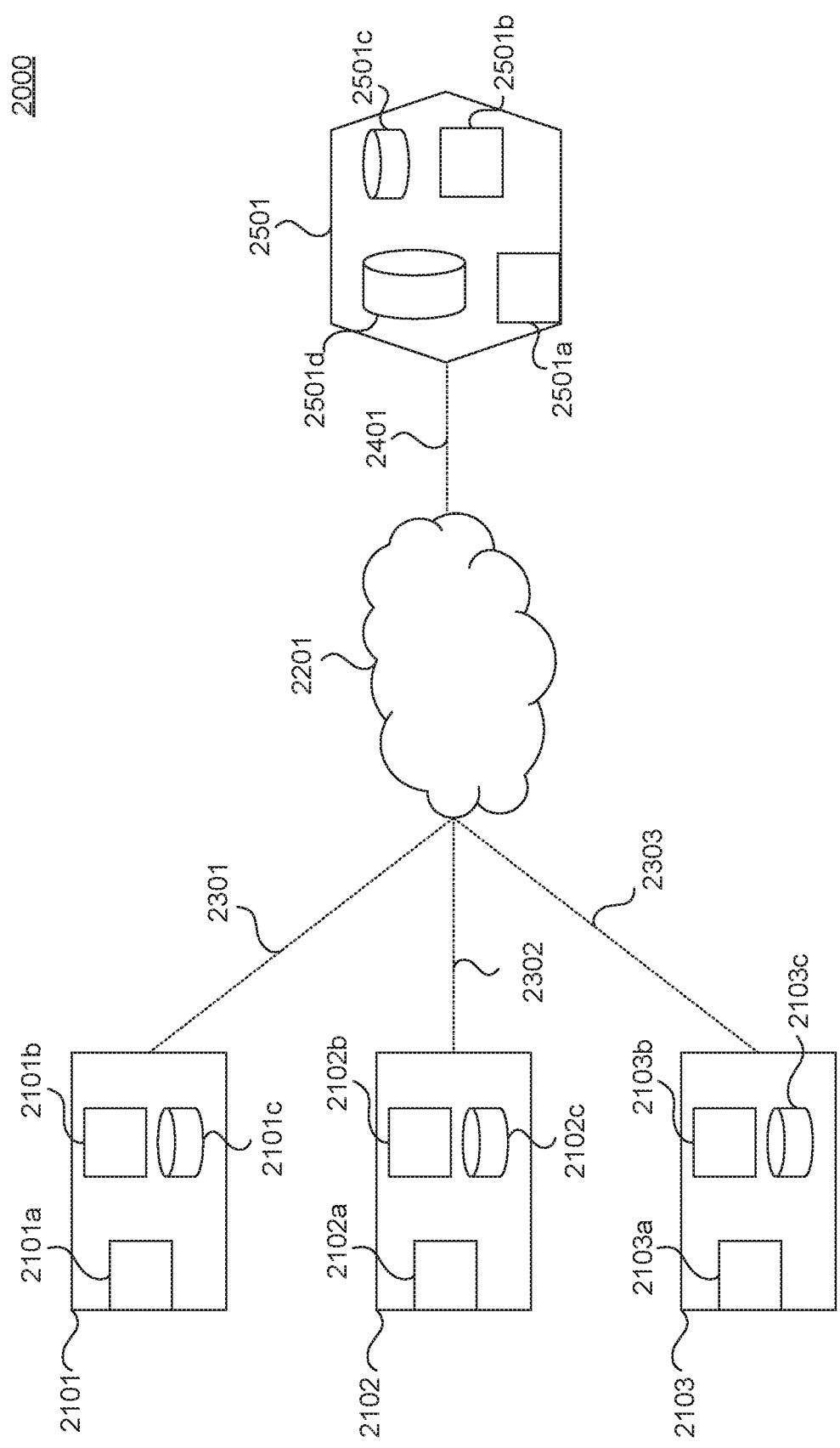
FIG. 2 is a diagram of an example network architecture according to one or more embodiments.

FIG. 2 depicts an example of a network architecture 2000 for an embodiment with three access points. Although only three access points are shown, there may be any number of access points in this or other embodiments as discussed herein. APs 2101, 2102, and 2103 are part of the same mesh network and connected to the Internet 2201 via logical links 2301, 2302, and 2303, possibly using a gateway (not shown). Each AP may have a communications interface (2101a, 2102a, 2103a), a processor (2101b, 2102b, 2103b), and memory (2101c, 2102c, 2103c). AP 2101 uses logical link 2301, AP 2102 uses logical link 2302, and AP 2103 uses logical link 2303. The links in FIG. 2 as shown are logical but the actual physical links may be different involving a couple of hops. As an example, the logical link from AP 2101 to the Internet 2201 may follow the path AP 2101-AP 2102-Gateway (not shown)-Internet 2201. There is also a cloud network controller 2501 located at the cloud that is connected to the Internet 2201 via logical link 2401. Similar to the logical links of access points, the logical link of the cloud network controller 2401 may involve actual multi-hop paths that involve additional network elements, such as routers, switches, etc. not shown. The cloud network controller 2501 comprises a communication interface 2501a, a processor 2501b, a memory 2501c, and a hard drive 2501d. In one implementation, there are a plurality of different mesh networks that are connected to the same cloud network controller. In another implementation, there is more than one cloud network controller that may be dispersed geographically, each of which serve different sets of wireless mesh networks. In an embodiment, the cloud network controller may be on the same local area network with the wireless mesh so that access points can directly communicate with the access points without going over the Internet. In another implementation, the cloud network controller may be a server farm that can utilize parallel processing techniques to obtain shorter processing times with increased processing power. In another implementation, the cloud network controller may be one or more computing devices connected to one or more databases, where a computing device may be a personal computer, a laptop, a server, a mobile computing device, and the like. In another implementation, the cloud network controller may be referred to as a cloud computer, cloud computers, cloud processing, cloud computing, the cloud, and the like.

In some embodiments channel quality measurements from the access points may be used to decide on the best channel in which to operate. Clear channel assessment (CCA) measurements of the access points may also be used, as well as any metric that measures the quality of a candidate channel, such as the number and strength of overlapping basic service sets, interference, radar presence, received power indicator, and the like. These measurements may be active or passive and may be averaged over time, and may depend on the capabilities of the access points together with the preference of the network administrator.

Each access point may periodically and simultaneously scan all the 20 MHz channels given by the controller and perform channel quality measurements on the given set of channels. In other embodiments, an access point may scan the channels sequentially. In one example the clear channel assessment is performed by switching to a channel and listening for the channel for a given time period, called dwell time, to observe the fraction of time the channel is observed to be idle. In one case the result of a clear channel assessment may be a percentage that shows the fraction of time the channel is found to be idle. In another case, this percentage may be obtained by dividing the idle time by the dwell time.

Figure 3:
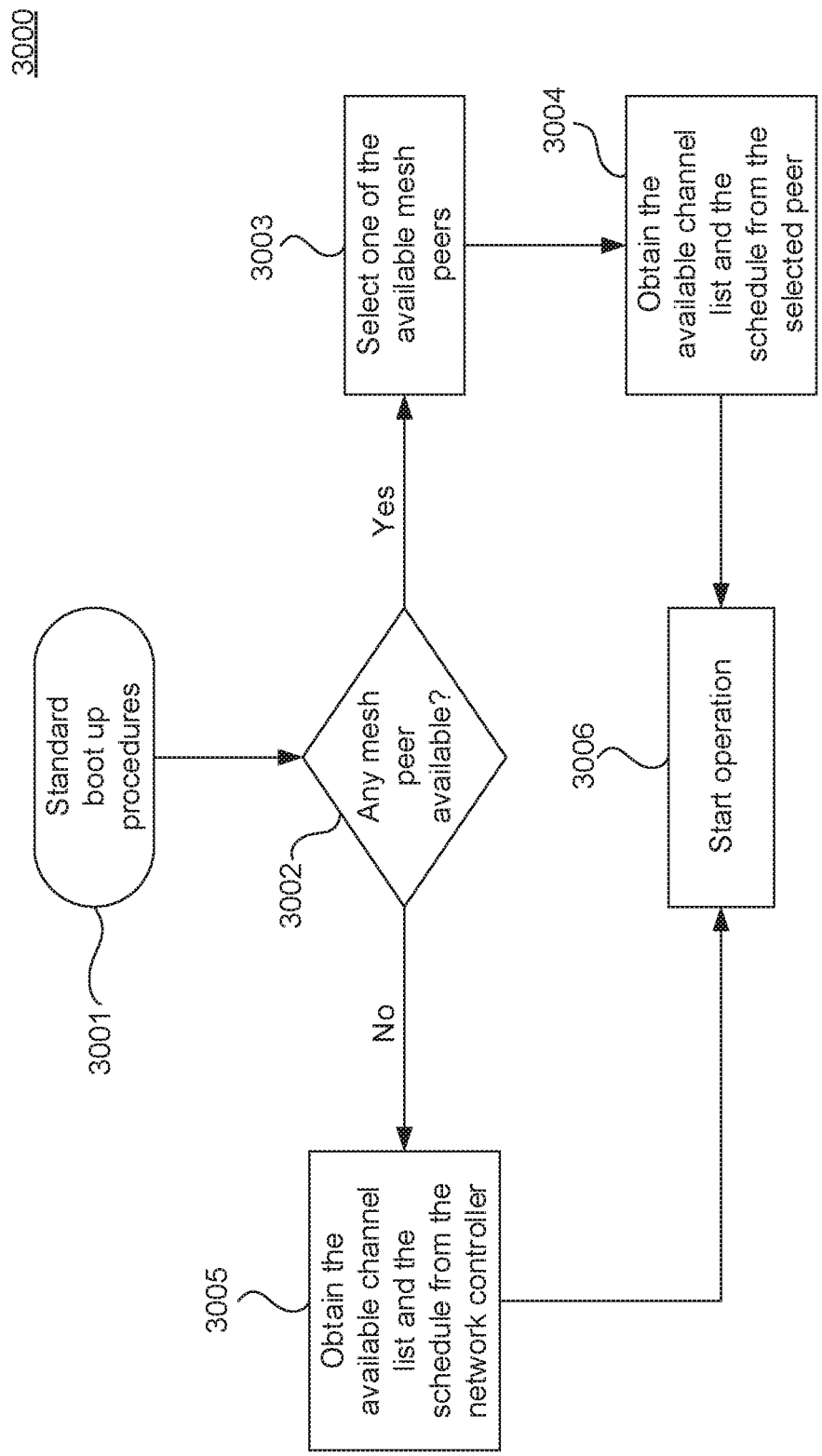
FIG. 3 is a flow chart of an example procedure of an access point during boot up according to one or more embodiments.

FIG. 3 is a flow chart that shows an example procedure 3000 of an access point during boot up. After performing a standard boot up procedure that may include, but is not limited to, loading the file system and the kernel, starting the required services 3001, the access point may check if it has any mesh peers that are already operating 3002. In one implementation, the checking step 3002 may be performed using unicast packages to check each mesh peer separately. In another implementation, the checking step 3002 may have a broadcast message sent and available mesh peers may respond upon receiving the broadcast message. If there are any mesh peers available, the access point may select 3003 one of the available mesh peers. In one implementation, this selection 3003 may be made randomly. In another implementation, this selection 3003 may be based on the medium access control (MAC) address of the available access points and the access point with the highest MAC address is selected. In another implementation, the access point that is closest to the gateway may be selected 3003. After a mesh peer is selected, the access point obtains the available channel list and the schedule from the selected peer 3004. If there are no mesh peers available, the available channel list and the schedule may be obtained from the cloud network controller 3005. Regardless of whether there are any mesh peers available, the procedure may culminate continues with the access point starting its operation at 3006.

The available channel list may be a simple list of channels to be scanned that is determined at the cloud network controller. The cloud network controller may determine the available channel list depending on a couple of factors such as the geographical location of the network, client station and access point capability, recent observation of radar signals on the channels, and the like. The cloud network controller may update the available channel list at any time and sends the new available channel list to the access points.

Figure 4:
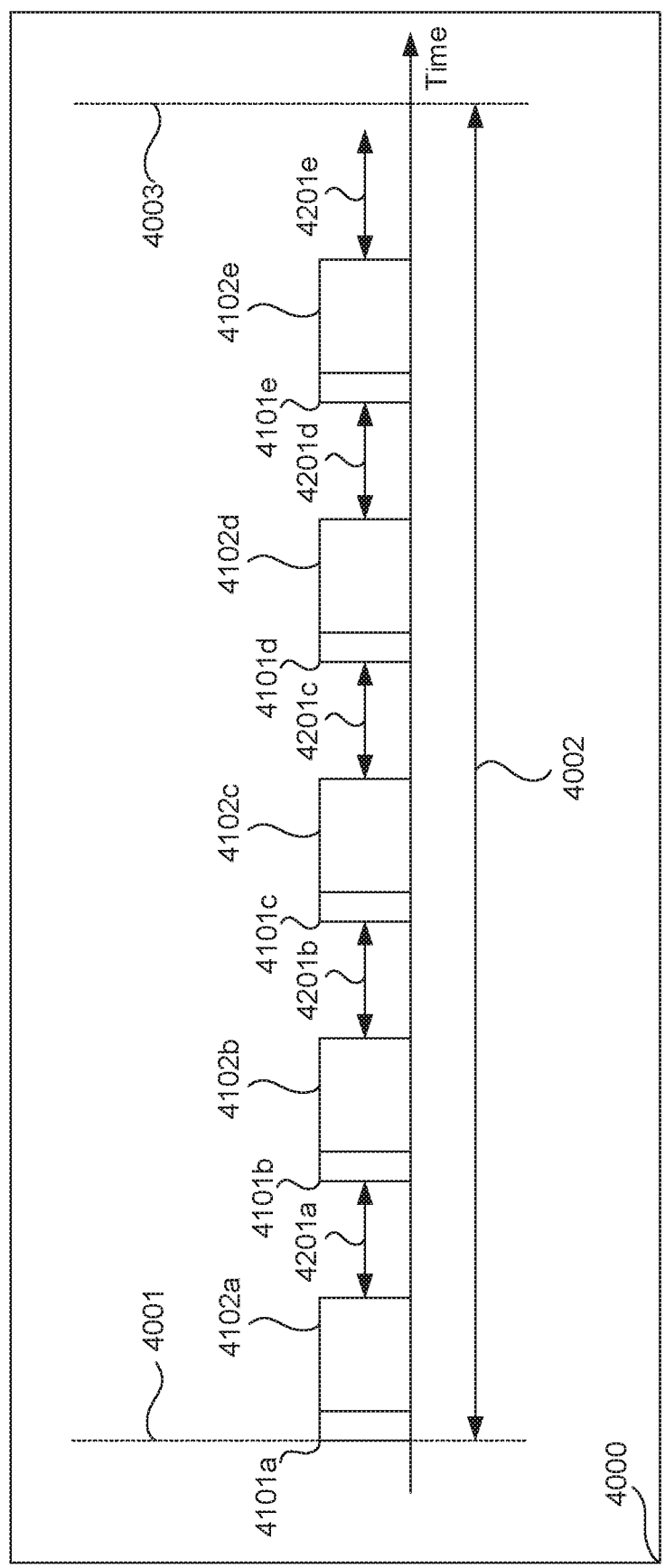
FIG. 4 is a diagram of an example schedule for a number of channels in a list according to one or more embodiments.

The schedule may be based on the number of channels in the available channel list. FIG. 4 shows a diagram showing an example schedule 4000 with five channels in the available channel list. In one embodiment, the schedule information may contain a start time 4001, a period 4002, a measurement time 4101 and 4102, and a home channel time 4201.

The start time 4001 may show the nearest time when the next scan will begin.

The scanning process occurs periodically with a period 4002 of time of the scans. For instance, if the start time is S and the period is T, the next scans will start at S+T, S+2T, S+3T, so on and so forth. As shown in FIG. 4, the next scan takes place at 4003, exactly a period length later than the start time 4001, and at the end of the period 4002. In one implementation, the period may be set for 1 minute.

The measurement time 4101 and 4102 may be the time spent for measuring the quality of a given channel. It may comprise two parts: The scan offset 4101, which serves as a guard period to account for slight synchronization errors, and the dwell time 4102 during which the actual measurement is made. In some embodiments, all mesh access points within the network may be synchronized in time; hence, they may start and finish the channel quality measurements almost at the same time. By working with synchronized access points, measurements that are more reliable may be obtained, especially on the operating channel, as all access points may stop any traffic during measurements. Slight synchronization errors may be handled by the scan offset 4101. This synchronization may be provided by a known method such as that disclosed in UK Patent Application GB1522654.1, which is hereby incorporated by reference. In one implementation, the scan offset may be set as 5 ms and the dwell time may be set as 50 ms. The duration of the dwell time may depend on the type and number of channel quality measurements that are to be taken. Although having a long dwell time gives more accurate results, it may cause service degradation for the clients. Hence, it may be desirable that the dwell time is as short as possible while being reliable. Depending on hardware minimum time limits for channel quality measurements, the dwell time may not be arbitrarily short. As shown in FIG. 4, each instance of the scan offset may be indicated by 4101a, 4101b, 4101c, 4101d, and 4101e for the length of the period 4002. Additionally, each instance of the dwell time may be indicated by 4102a, 4102b, 4102c, 4102d, and 4102e for the length of the period 4002.

The home channel time 4201 may be the time that an access point spends at its operating channel between two different channel measurements. As mentioned before, access points may stop any transmissions during channel quality measurements. After taking a measurement, an access point may switch back to its operating channel to serve clients for the duration of home channel time. After staying on the operating channel for a duration of a home channel time 4201, the access point may switch to the next channel in the available channel list for the channel quality measurement unless the available channel list is exhausted. On the other hand, if the available channel list is exhausted, the access point may stay on the operating channel to serve clients until the beginning of the next scan period 4003. In one example, the home channel time is set as 1 second. As shown in FIG. 4, each instances of the home channel time may be indicated by 4201a, 4201b, 4021c 4201d, and 4201e for the length of the period 4002.

The schedule is configurable by the cloud network controller, and may be changed at runtime depending on the factors such as load of the mesh network, network administrators preference, and the like.

Figure 5:
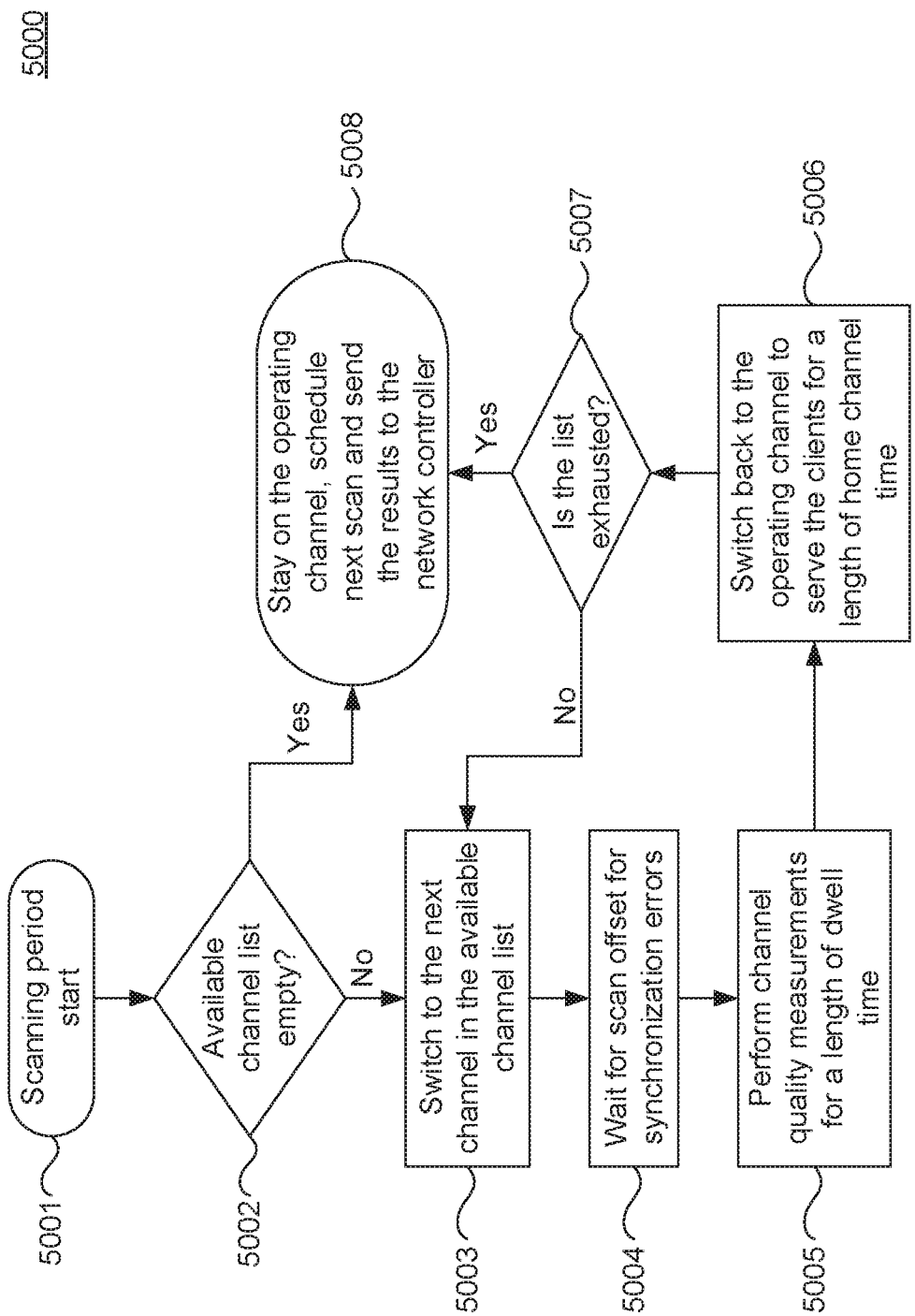
FIG. 5 is a flowchart of an example procedure at an access point according to one or more embodiments.

FIG. 5 is a flowchart that shows an example procedure 5000 that may be executed at each access point. After the start of a scanning period 5001, the access point may check if the available channel is empty or not 5002. If the available channel list is empty, the access points resume normal operation 5008. Otherwise, the access point may switch to the first channel in the list 5003, wait for a scan offset for possible synchronization errors 5004, perform channel quality measurements for a length of dwell time 5005, then switch to the operating channel to serve the clients for a duration of home channel time 5006. If there are still any channels in the available channel list that are to be scanned 5007, the process may continue with the next channel 5003. Otherwise, the access point may continue to stay on the operating channel, schedule the next scan based on the period, and send the current set of results to the cloud network controller 5008.

Hence, the cloud network controller obtains the periodic channel quality measurements from the access points and stores them. The information related to the measurement results may be stored in volatile memory of the system or it may be recorded in a digital storage medium such as a hard drive or an SSD drive and/or the like. In one example, a commercial off the shelf database system may be used to store the measurement results. A decision point may be defined as a point in time where the channel decision is to be made by the cloud network controller. The decision points may be periodic so that the cloud network controller periodically evaluates the candidate channels to find the best channel. If the best channel is the same as the operating channel, then the network may stay on the same channel. Otherwise, the system will decide on whether to switch to the best channel or not.

Figure 6:
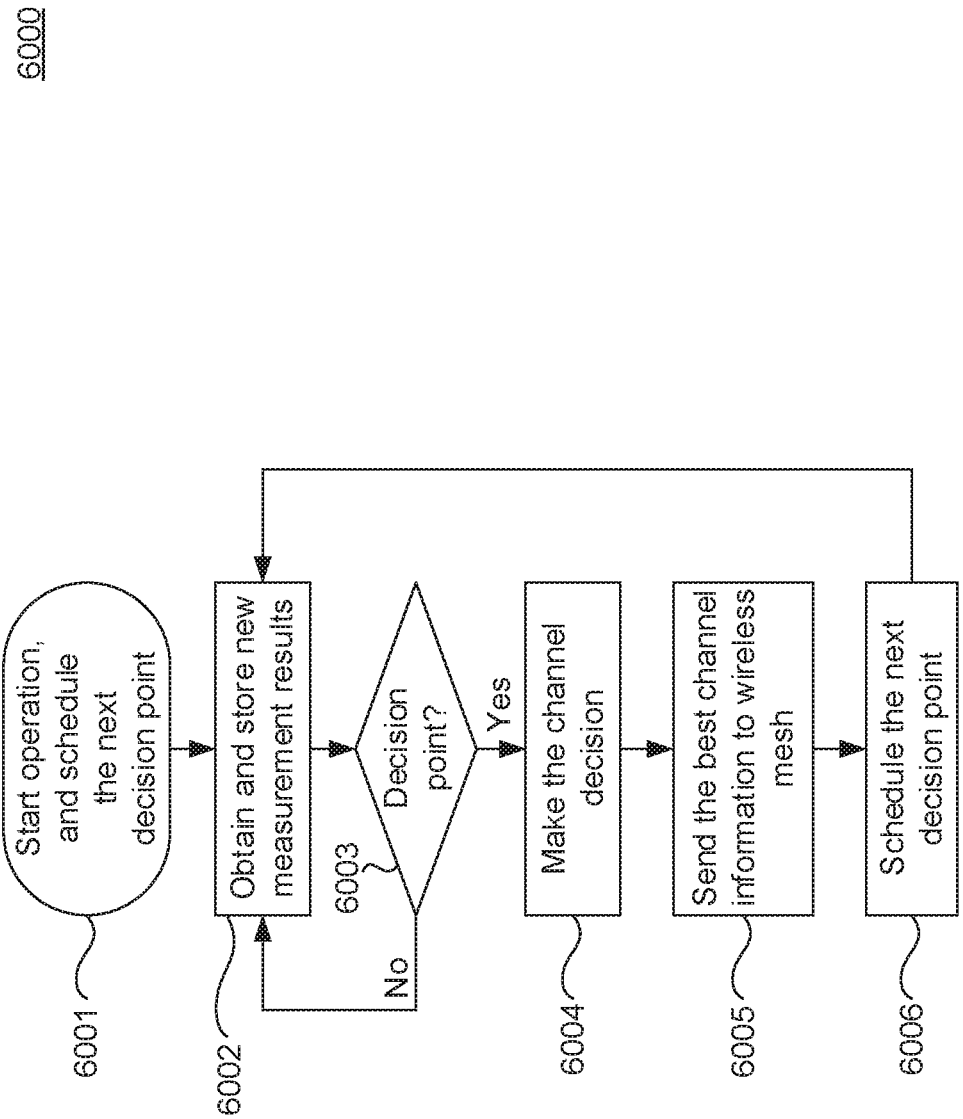
FIG. 6 is a flowchart of an example procedure at a network controller according to one or more embodiments.

FIG. 6 shows a flowchart of an example process 6000 that is executed at the cloud network controller for each wireless mesh network. When the cloud network controller starts operation, it may schedule the next decision point 6001. After this step, the cloud network controller may wait for measurements from the access points and store the obtained measurements 6002 until the decision point. When the decision point arrives 6003, the cloud network controller may make the channel decision 6004, and send the best channel information to all the access points in the wireless mesh network 6005. In one implementation, the cloud network controller sends only the best channel information to the wireless mesh network. In another implementation, the best channel information is a list of channels sorted according to their qualities. Once the best channel information is sent to the wireless mesh network, the cloud network controller may schedule the next decision point 6006, after which it may continue to collect measurements from the access points 6002.

The channel decision may be performed at the cloud network controller periodically. It may be desirable that this decision period should not be too small as each channel switch may induce overhead to the wireless network. However, it may also be desirable that it should not be too large so that short-term opportunities may not be missed. In one example, this decision period is set to one hour.

As the access points send their measurements to the cloud network controller, the cloud network controller may store these measurements in a database to utilize later for channel selection. For the decision-making process, the cloud network controller may employ three processors: forecasting processor, scoring processor, and the decision processor, operating in that order where each processor uses the output of the previous processor. In one example, these three processors may be separate processors, or they may be subroutines performed by a single processor, such as an ASIC. The processors as discussed herein may also be functions, algorithms, and/or methods in the logical sense, but may be embodied differently in the physical sense.

Figure 7:
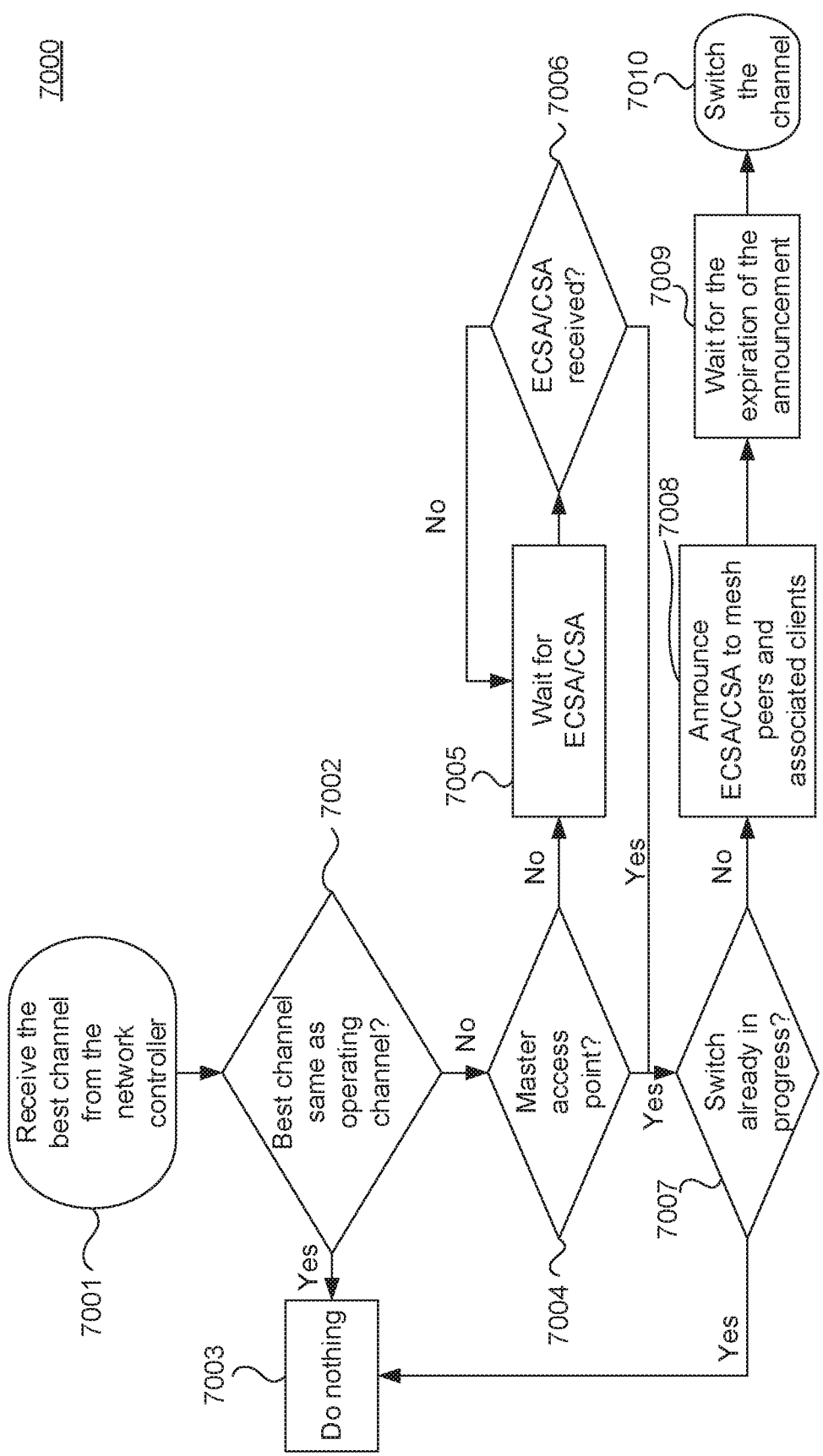
FIG. 7 is a flowchart of an example process at an access point according to one or more embodiments.

FIG. 7 shows a flowchart of an example process 7000 that is run on each access point after the reception of best channel information 7001 from the cloud network controller. The access point may first check whether the operating channel is the same as the best channel 7002. If that is the case, the access point may do nothing and stay on its current channel 7003. Otherwise, the access point may check if it is the master access point 7004. If that is not the case, the access point may wait for an enhanced channel switch announcement (ECSA) or channel switch announcement (CSA) from other mesh peers 7005 until it receives one 7006. If the access point is the master access point or an access point receiving ECSA/CSA, it first checks if there is already a channel switch in progress 7007. If that is the case, the access point may do nothing 7003. Otherwise, the access point may announce ECSA/CSA to its mesh peers and associated clients 7008. After that, the access point may wait for the expiration announcement 7009, after which the access point may switch its operating channel 7010. If the best channel information received from the cloud network controller is a list of channels, the master access point tries to switch to the best channel (first channel in the list). If the switch is successful, the other channels in the list may be ignored. Otherwise, the next channel in the list is tried. The process may continue in this manner until a successful switch.

On the other hand, an access point receiving an ECSA or CSA, may first check if it is already performing a channel switch 7007. If that is the case, the ECSA or CSA may be ignored 7003. On the other hand, if the receiver access point is not performing a channel switch, it may adapt the ECSA or CSA, to announce the switch to its mesh peers and associated client 7008. After the expiration of the announcement period 7009, the receiver access point may also change its operating channel 7010.

Figure 8:
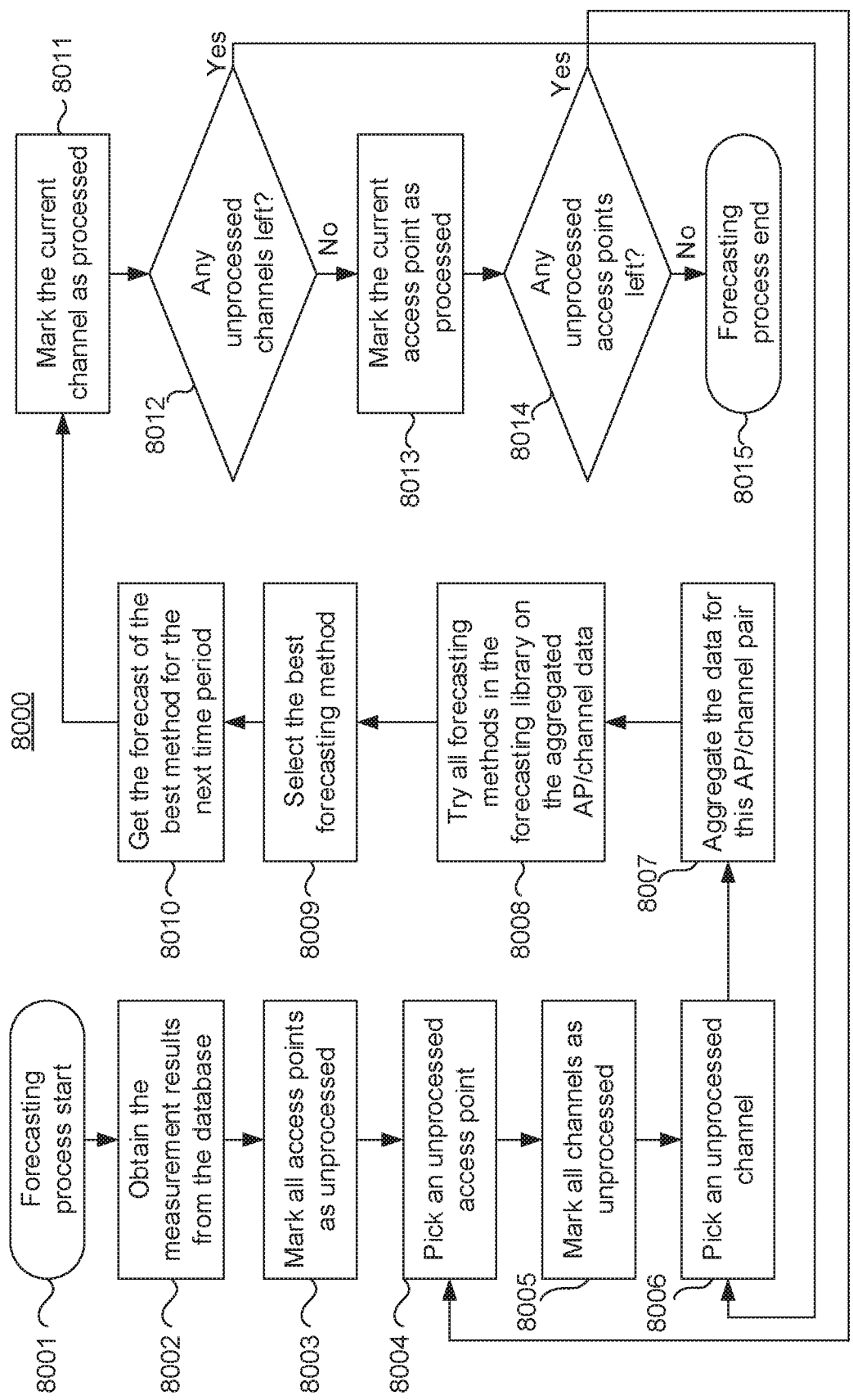
FIG. 8 is a flowchart of an example process at one or more cloud controllers according to one or more embodiments.

FIG. 8 shows a flowchart of an example forecasting procedure 8000 at the cloud controller. A forecasting processor may be executed for each type of channel quality measurements (e.g., once for clear channel assessment, once for strength of overlapping basic service sets, etc.). After beginning the forecasting 8001, the cloud network controller may obtain the measurement results of the related measurement type for the wireless network from the database 8002. During this step, the cloud network controller may obtain all the measurements related to this wireless network or the most recent ones (i.e., the measurements for the last seven days up to current time). Alternatively, the cloud network controller may provide a time average of measurements for a specified averaging window. The cloud network controller may mark all the access points in the wireless network as unprocessed 8003 and pick one of them for processing 8004. For the selected access point, the cloud network controller may mark all the channels in the available channel list of this network as unprocessed 8005 and select one of them for processing 8006.

In the next step, the cloud network controller may aggregate the measurement data for the given measurement type related to this access point/channel pair 8007. Measurements may be taken frequently (e.g., every minute) whereas the decision making process may run more seldom (e.g., every hour). One goal of this step may be to aggregate the frequent measurements and obtain a single representative data point for each different measurement and decision period in order to reduce the required processing power and to decrease the effect of short-term fluctuations in the measurements. The function that is used for aggregation may be any arbitrary function suited to this task, such as a simple average, weighted average, minimum, maximum, or the like. In one implementation, 60 clear channel assessment measurements (one for each minute) within an hour may be averaged to obtain a single representative data point for the particular hour. Moreover, outlier detection/elimination procedures may also be applied before aggregation to account for unusual/extraordinary behavior in the network. In one implementation, each measurement within an hour that is one standard deviation away from the mean of the measurements of that type for that hour may be classified as outliers and eliminated. After this step, the cloud network controller may have the aggregated data for the current decision period as well as the past decision periods for the current access point/channel pair.

In the next step, the cloud network controller may try all the forecasting methods in the forecasting library on the aggregated data set of that measurement type for the current access point/channel pair 8008. The forecasting library may be a software library that includes various forecasting methods. In one implementation, the software library may utilize any forecasting method that may be useful, such as linear regression, moving average, exponential smoothing, autoregressive integrated moving average, or the like. Furthermore, any parametric method that requires input parameters (e.g., moving average requires window size as input) may be tried with a different set of values for the input parameters.

In one example, exponential smoothing may use the following formula for forecasting:

$$Y_{t+1}=beta*X_t+(1-beta)*Y_t$$

with initial condition $Y_1=X_0$, where $Y_{t+1}$ is the forecast for time t+1, $X_t$ is the observed value for time t, and 0<beta<1 is the smoothing factor that shows the relative importance of the last observation compared to the previous observations. A beta value close to 1 may focus on the last observation, whereas a beta value close to 0 may put emphasis on the previous observations because of recursive nature of the equation. Depending on the value of beta, the accuracy of the exponential smoothing may vary for a given data set. Hence, different beta values may be sought to find the ideal beta that fits the data set best. In one implementation, all beta values from 0.1 to 1.0 with an increment of 0.1 may be evaluated.

In another example, double exponential smoothing may use the following formula for forecasting:

$$Y_{t+1}=beta*X_t+(1-beta)*(Y_t+B_t)$$

where beta is the same as exponential smoothing, and $B_t$ estimates the trend in data at time t. $B_t$ may be given by:

$$B_t=gamma*(Y_t-Y_{t-1})+(1-gamma)*B_{t-1}$$

where 0<gamma<1 is the trend smoothing factor. Depending on the values of beta and gamma, the accuracy of the double exponential smoothing may vary for a given data set. Hence, different beta and gamma values may be sought to find the ideal beta that fits the data set best. In one implementation, all beta values from 0.1 to 1.0 with an increment of 0.1 together with all gamma values from 0.1 to 1.0 with an increment of 0.1 may be evaluated.

In another example, a simple moving average may use the following formula:

$$Y_{t+1}=(X_{t-w}+X_{t-w+1}+X_{t-w+2}+\ldots+X_{t-1}+X_t)/w$$

where w is called the window size and an input parameter to the method. A large value of w may imply that the forecasted value depends on a larger set of previous observations. Furthermore, the forecast may change more slowly with a large value of w, since the forecast may be more influenced by past values. A small w value may cause more fluctuations because the recent observations may have a larger impact to the forecast. Depending on the value of w, the accuracy of the moving average may vary for a given data set. Hence, different w values may be evaluated to find the ideal w that fits the data set best. In one implementation, all w values from 2 to 60 with an increment of 1 may be evaluated.

The parameters for a given forecasting method contained in the forecasting processor together with a reasonable range of those parameters may be identified. As discussed herein, a broad range of parameters for any contained method may be tried to find the best fit to the data.

Once all, or some, of the forecasting methods (possibly with different input parameters) have been tried, the method (and possibly the parameter set) that fits the data best may be selected 8009. To measure how well a given model (and possibly the parameter set) fits the data, any reasonable metric suited to this task may be utilized and the corresponding error metric may be minimized. In one example, a sum of squared errors may be used which is the sum of the squared differences between each observation and the corresponding forecast. In another example, a mean square error may be used, which is the average of the sum of squared errors. In another example, a mean absolute error may be used, which is the average of the absolute values of the differences between each observation and the corresponding forecast. In another example, a coefficient of determination may be used, which is given by 1−SSE/SStot where SSE is the sum of squared errors as defined above, and SStot is the sum of squared differences between each observation and the mean of observations.

During the operation of the network, lots of measurements may be taken by the access points and stored at the database by the cloud network controller. The number of measurements in the database increases with time. Hence, there may be a huge number of measurements in the database to utilize for forecasting. With such a huge amount of data, the processing of the forecasting processor may take a long time. To alleviate this problem, the disclosure may use the measurements of the last N days. In an embodiment, the parameter N is configured by the network administrator. In an exemplary embodiment, the default value of N is set as seven days unless explicitly changed by the network administrator.

Once a method (and possibly a parameter set) has been selected for the given measurement type, the forecast of the selected method for the next decision period may be obtained for the current access point/channel pair 8010. Then, the current channel may be marked as processed for the current AP 8011. In the next step, the processor may check if there are any unprocessed channels left for the current access point 8012. If that is the case, another unprocessed channel may be selected 8006 and steps 8007-8010 may be performed for this updated access point/channel pair. Otherwise, the cloud network controller may move to step 8013 where the current access point is marked as processed. Subsequently, the cloud network controller may check if all the access points are processed or not 8014. If all the access points are processed, the execution of the forecasting processor may end 8015. Otherwise, the processor may continue with the next unprocessed access point 8004.

Hence, the output of the forecasting processor may be the forecast for the next decision period for a given channel quality measurement type for each access point/channel pair. The geographical/topological differences between access points, and different usage of channels across time, may thus be accounted for. Since the forecasting processor may be executed separately for each different type of channel quality measurement, the forecasts for each access point/channel/channel quality measurement type may be obtained.

Channel quality measurements may be prone to errors where an erratic measurement may cause a suboptimal channel. Even if the channel quality measures are reliable, the wireless channel conditions may change frequently due to many factors such as usage patterns, time of the day, fading, and the like. By using frequent measurements and aggregating them with outlier elimination, some of these errors may be avoided.

Figure 9:
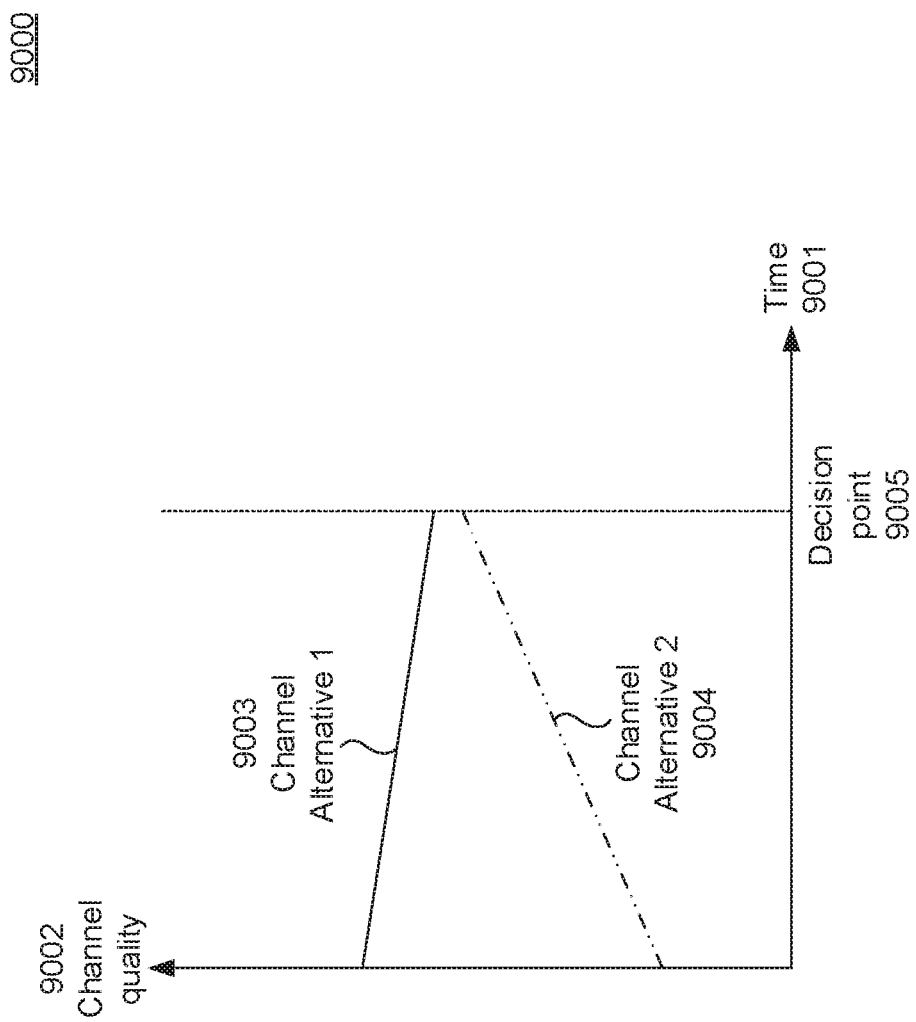
FIG. 9 is a chart of example measurements of time versus channel quality as it relates to one or more embodiments.

FIG. 9 shows a chart 9000 of an example where using the last measurements or a set of the last measurements may not account for trends and seasonality of the data. Channel quality 9002 is shown on the vertical axis and time 9001 is shown on the horizontal axis. In this example, channel alternative 1 9003 has historically better quality than channel alternative 2 9004. Any method that uses the last set of measurements without forecasting selects channel alternative 1 9003. However, there is a clear downward trend in the quality of channel alternative 1 9003. On the other hand, channel alternative 2 9004 has an upward trend in channel quality and will probably surpass channel alternative 1 9003 at or near the decision point 9005

Figure 10:
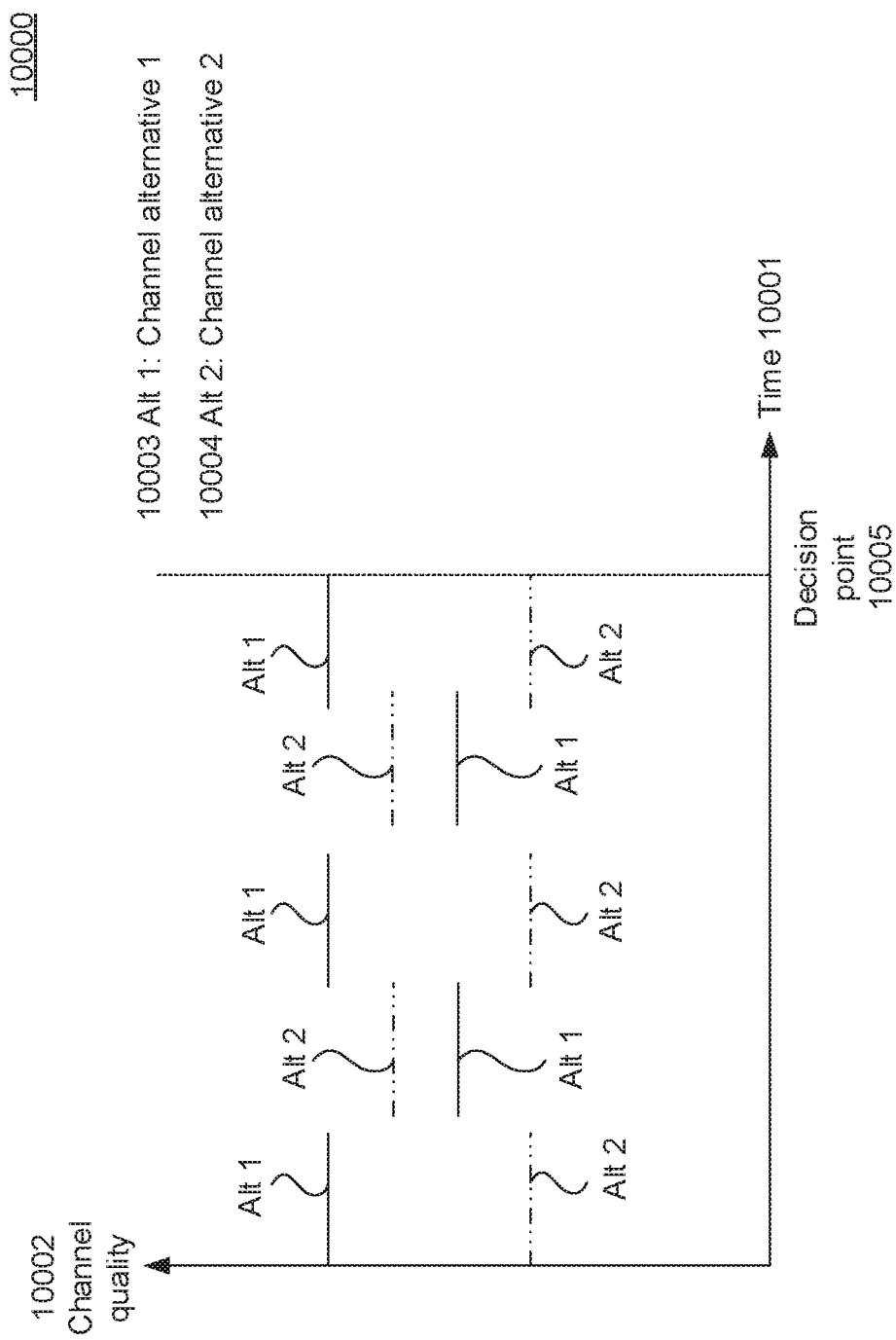
FIG. 10 is a chart of example measurements of time versus channel quality as it relates to one or more embodiments.

FIG. 10 shows a chart of another example where there is a seasonal factor and channel alternative 1 10003 (Alt 1) has better quality for the last set of measurements in addition to having better quality in the overall data. Channel quality 10002 is on the vertical axis and time 10001 is on the horizontal axis. Any method that uses the last set of measurements without forecasting selects channel alternative 1 10003. However, looking at the previous data one can deduce that channel alternative 2 10004 (Alt 2) is going to have better quality than channel alternative 1 10003 in the near future, such as at or near the decision point 10005.

Figure 11:
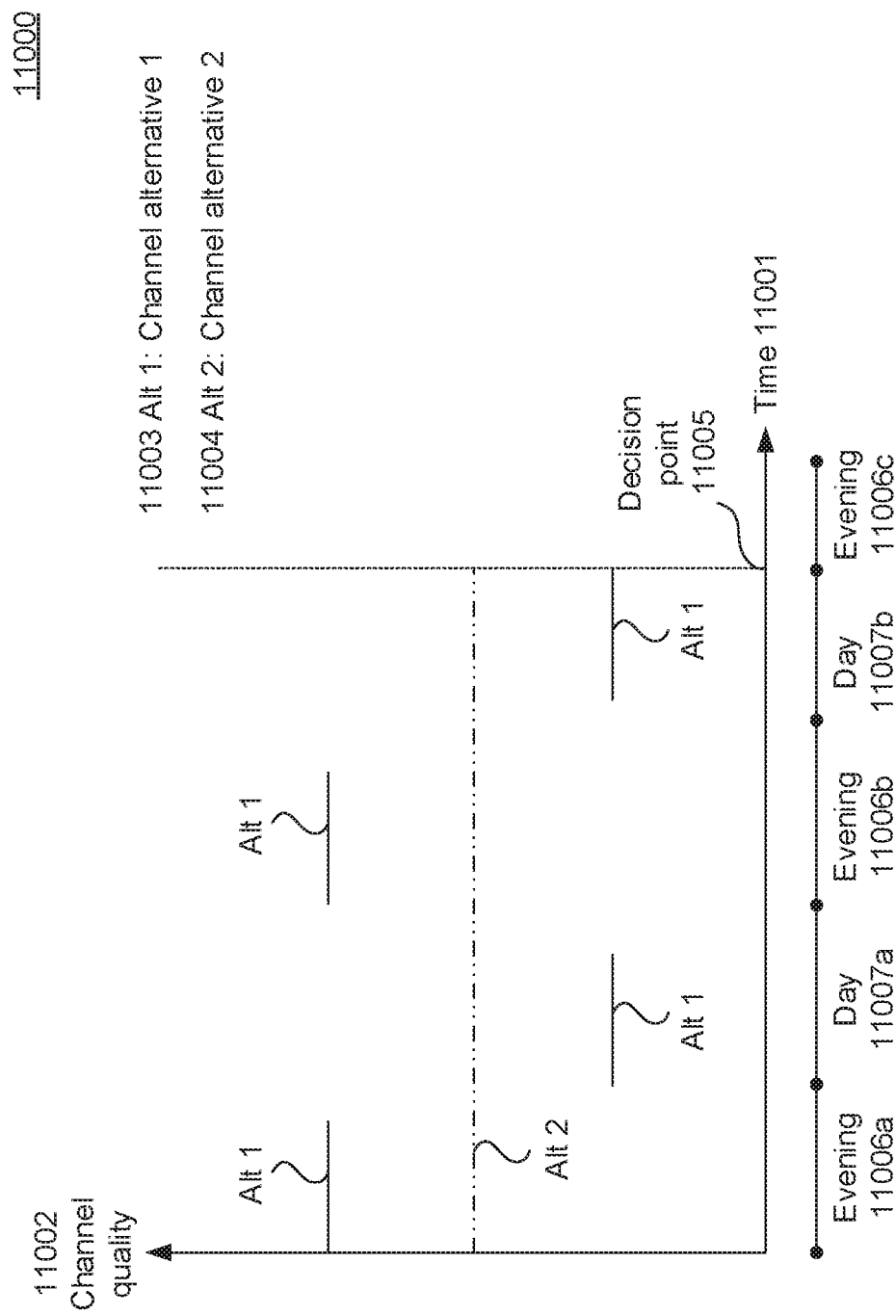
FIG. 11 is a chart of example measurements of time versus channel quality as it relates to one or more embodiments.

FIG. 11 shows a chart 11000 of another example where in a business district scenario where businesses utilize channel alternative 1 during the day. Evening 11006 and day 11007 is shown in alternating segments with the passage of time, naturally, where there are 11006a, 11006b, and 11006c segments of evening and 11007a and 11007b segments of day. Channel quality 11002 is on the vertical axis and time 11001 is on the horizontal axis. Channel alternative 1 11003 (Alt 1) may have low quality during the daytime but high quality during the evening. On the other hand, channel alternative 2 11004 (Alt 2) may have a stable quality overall. At the decision point 11005 just before evening, one may mistakenly conclude that channel alternative 2 11004 is a better choice for the upcoming evening by looking at the last set of measurements. On the contrary, it may be shown that channel alternative 1 11003 has better quality in the evenings considering the seasonality.

By using forecasts of channel quality measurements to predict the best channel/channels, the concepts discussed herein may avoid some of the issues as seen in the examples of FIGS. 8, 9, and 10.

In one embodiment, all processing related to channel selection may be performed at the cloud network controller due to the required memory and processing power to process huge amounts of data. In one implementation, the forecasting processor always tries all the forecasting processors (possibly with different parameters) in the forecasting library. In another implementation, the forecasting processor learns the best performing methods for each access point/channel pair, uses only those forecasting methods that were learned for a particular access point/channel pair, and periodically relearns these best performing methods to account for behavior changes.

The scoring processor may use the output of the forecasting processor to obtain a single score for each channel. First, different types of channel quality measurements may be combined for each access point/channel pair to obtain a single value. To obtain the single value the forecast for each measurement type may be normalized so that it is mapped to a value between 0 and 1. For example, this normalization may be performed by dividing each forecast for a particular measurement type by the maximum observed forecast for that measurement type across all access point/channel pairs. Next, the weighted sum of the mapped values may be taken to obtain a single score for a given AP/channel pair. In this weighted sum, the measurement types that have positive influence on the network (having a higher value for the measurement type is better) may have positive weights. On the other hand, the measurement types that have negative influence on the network (having a lower value for the measurement type is better) may have negative weights. The selection of weights may depend on the prioritization of the network administrator, and any combination of weights may be possible.

After obtaining a single score for all access point/channel pairs, for each channel, the scores for all access points for the channel may be aggregated to obtain a single value for a given channel. This aggregation can be performed using any function suited to this task, such as simple average, weighted average, minimum, maximum, or the like.

As discussed herein, some embodiments relate to the measurement results for each 20 MHz channel for a scenario that covers the channels in 2.4 GHz band, however, these embodiments may also apply to scenarios where 40 MHz, 80 MHz and 160 MHz channels in the 5 GHz band may be used by combining contiguous 20 MHz channels. Also, some embodiments discussed herein may also cover a scenario for 802.11ac where 80 MHz+80 MHz contains 2 different sets of 4 contiguous 20 MHz channels. Moreover, there may be a decision on the selection of the primary 20 MHz channel for these high bandwidth channels. For example, if the bandwidth is selected as 80 MHz and the primary 20 MHz channel is selected as channel 36 (5180 MHz), then the secondary 20 MHz channel may be channel 40 (5200 MHz) and the secondary 40 MHz channel may be channel 46 (combination of channels 44 and 48).

In one embodiment, the bandwidth and primary 20 MHz channel selection may be performed by using the scores of the 20 MHz channels and evaluating each bandwidth alternative. For the 20 MHz bandwidth, there may only be the 20 MHz primary channel, and each 20 MHz channel's score may be already calculated using the methods discussed herein.

For the 40 MHz bandwidth, for each possible 40 MHz channel two scores may be calculated (since there are two 20 MHz primary channel alternatives that can be the primary 20 MHz channel) and the maximum of these two scores may be taken as the final score for this 40 MHz channel. For a given 40 MHz channel, let the scores for the contained two 20 MHz channels be x1 and x2. Then the score for the 40 MHz channel is calculated as $$\max(x1+\alpha*(\min(x1,x2)-|x1-x2|), x2+\alpha*(\min(x1,x2)-|x1-x2|))$$

where alpha is a constant between 0 and 1. The first term corresponds to the case where the channel with score x1 is set as the primary 20 MHz channel and the channel with score x2 is set as the secondary 20 MHZ channel. Similarly, the second term corresponds to the case where the channel with score x2 is set as the primary 20 MHz channel and the channel with score x1 is set as the secondary 20 MHZ channel. The alternative with the maximum score between these two cases may be selected and the primary 20 MHz channel may be determined by the alternative that gives the maximum score between the two terms. Ties may be broken arbitrarily. The selection of alpha may denote the relative importance of the secondary 20 MHz channel and may be set by the network administrator at runtime. In one implementation, an alpha value of 0.5 may be used.

As an example, suppose 20 MHZ channels 36 and 40 have scores of 0.8 and 0.6, respectively; and alpha is set to 0.5. Then the score for the 40 MHZ channel is max(0.8+0.5*(min(0.8, 0.6)−|0.8−0.6|), 0.6+0.5*(min(0.8, 0.6)−|0.8−0.6|))=max(1.0, 0.8)=1.0. Furthermore, the primary 20 MHz channel may be selected as channel 36 for this alternative since that combination gives the better score.

For the 80 MHz bandwidth, for each possible 80 MHz channel, four scores may be calculated (since there are four 20 MHz primary channel alternatives that can be the primary 20 MHz channel) and the maximum of these four scores may be taken as the final score for this 80 MHz channel. For a given 80 MHz channel, let the scores for the contained four 20 MHz channels be x1, x2 x3 and x4. Then the score for the 80 MHz channel is calculated as $$\max(x1+\alpha*(\min(x1,x2)-|x1-x2|)+\alpha^2*(\min(x1,x2,x3,x4)-|\min(x1,x2)-\min(x3,x4)|),$$

$$x2+\alpha*(\min(x1,x2)-|x1-x2|)+\alpha^2*(\min(x1,x2,x3,x4)-|\min(x1,x2)-\min(x3,x4)|),$$

$$x3+\alpha*(\min(x3,x4)-|x3-x4|)+\alpha^2*(\min(x1,x2,x3,x4)-|\min(x1,x2)-\min(x3,x4)|),$$

$$x4+\alpha*(\min(x3,x4)-|x3-x4|)+\alpha^2*(\min(x1,x2,x3,x4)-|\min(x1,x2)-\min(x3,x4)|))$$

where alpha is a constant between 0 and 1 that is explained above. The first term corresponds to the case where the channel with score x1 is set as the primary 20 MHz channel, the channel with score x2 is set as the secondary 20 MHZ channel, and the combination of channels with scores x3 and x4 is set as the secondary 40 MHz channel. The other terms correspond to the cases of different primary 20 MHz channels. The alternative with the maximum score among these four cases may be selected and the primary 20 MHz channel may be determined by the alternative that gives the maximum score among the four terms. Ties may be broken arbitrarily.

As an example, suppose 20 MHZ channels 36, 40, 44 and 48 have scores of 0.8, 0.6, 0.9 and 0.5, respectively; and alpha is set to 0.5. Then the score for the 80 MHZ channel is $$\max(0.8+0.5*(\min(0.8,0.6)-|0.8-0.6|)+0.25*(\min(0.8,0.6,0.9,0.5)-|\min(0.8,0.6)-\min(0.9,0.5)|),$$

$$0.6+0.5*(\min(0.8,0.6)-|0.8-0.6|)+0.25*(\min(0.8,0.6,0.9,0.5)-|\min(0.8,0.6)-\min(0.9,0.5)|),$$

$$0.9+0.5*(\min(0.9,0.5)-|0.9-0.5|)+0.25*(\min(0.8,0.6, 0.9,0.5)-|\min(0.8,0.6)-\min(0.9,0.5)|),$$

$$0.5+0.5*(\min(0.9,0.5)-|0.9-0.5|)+0.25*(\min(0.8,0.6, 0.9,0.5)-|\min(0.8,0.6)-\min(0.9,0.5)|))=\max(1.1, 0.9,1.05,0.65)=1.1$$

Furthermore, the primary 20 MHz channel may be selected as channel 36 for this alternative as that combination gives the best score.

For the 160 MHz bandwidth, for each possible 160 MHz channel eight scores may be calculated (since there are eight 20 MHz primary channel alternatives that can be the primary 20 MHz channel) and the maximum of these eight scores is taken as the final score for this 160 MHz channel. For a given 160 MHz channel, let the scores for the contained eight 20 MHz channels be x1, x2 x3, x4, x5, x6, x7 and x8. Then the score for the 160 MHz channel is calculated as $$\max(x1+\text{alpha}*(\min(x1,x2)-|x1-x2|)+\text{alpha}^2*(\min(x1,x2,x3,x4)-|\min(x1,x2)-\min(x3,x4)|)+\text{alpha}^3*(\min(x1,x2,x3,x4,x5,x6,x7,x8)-|\min(x1,x2,x3,x4)-\min(x5,x6,x7,x8)|),$$

$$x2+\text{alpha}*(\min(x1,x2)-|x1-x2|)+\text{alpha}^2*(\min(x1,x2,x3,x4)-|\min(x1,x2)-\min(x3,x4)|)+\text{alpha}^3*(\min(x1,x2,x3,x4,x5,x6,x7,x8)-|\min(x1,x2,x3,x4)-\min(x5,x6,x7,x8)|),$$

$$x3+\text{alpha}*(\min(x3,x4)-|x3-x4|)+\text{alpha}^2*(\min(x1,x2,x3,x4)-|\min(x1,x2)-\min(x3,x4)|)+\text{alpha}^3*(\min(x1,x2,x3,x4,x5,x6,x7,x8)-|\min(x1,x2,x3,x4)-\min(x5,x6,x7,x8)|),$$

$$x4+\text{alpha}*(\min(x3,x4)-|x3-x4|)+\text{alpha}^2*(\min(x1,x2,x3,x4)-|\min(x1,x2)-\min(x3,x4)|)+\text{alpha}^3*(\min(x1,x2,x3,x4,x5,x6,x7,x8)-|\min(x1,x2,x3,x4)-\min(x5,x6,x7,x8)|),$$

$$x5+\text{alpha}*(\min(x5,x6)-|x5-x6|)+\text{alpha}^2*(\min(x5,x6,x7,x8)-|\min(x5,x6)-\min(x7,x8)|)+\text{alpha}^3*(\min(x1,x2,x3,x4,x5,x6,x7,x8)-|\min(x1,x2,x3,x4)-\min(x5,x6,x7,x8)|),$$

$$x6+\text{alpha}*(\min(x5,x6)-|x5-x6|)+\text{alpha}^2*(\min(x5,x6,x7,x8)-|\min(x5,x6)-\min(x7,x8)|)+\text{alpha}^3*(\min(x1,x2,x3,x4,x5,x6,x7,x8)-|\min(x1,x2,x3,x4)-\min(x5,x6,x7,x8)|),$$

$$x7+\text{alpha}*(\min(x7,x8)-|x7-x8|)+\text{alpha}^2*(\min(x5,x6,x7,x8)-|\min(x5,x6)-\min(x7,x8)|)+\text{alpha}^3*(\min(x1,x2,x3,x4,x5,x6,x7,x8)-|\min(x1,x2,x3,x4)-\min(x5,x6,x7,x8)|),$$

$$x8+\text{alpha}*(\min(x7,x8)-|x7-x8|)+\text{alpha}^2*(\min(x5,x6,x7,x8)-|\min(x5,x6)-\min(x7,x8)|)+\text{alpha}^3*(\min(x1,x2,x3,x4,x5,x6,x7,x8)-|\min(x1,x2,x3,x4)-\min(x5,x6,x7,x8)|))$$

where alpha is a constant between 0 and 1 that is explained above. The first term corresponds to the case where the channel with score x1 is set as the primary 20 MHz channel, the channel with score x2 is set as the secondary 20 MHZ channel, the combination of channels with scores x3 and x4 is set as the secondary 40 MHz channel, and the combination of channels with scores x5, x6, x7, and x8 is set as the secondary 80 MHz channel. The other terms correspond to the cases of different primary 20 MHz channels. The alternative with the maximum score among these eight cases may be selected and the primary 20 MHz channel may be determined by the alternative that gives the maximum score among the eight terms. Ties may be broken arbitrarily.

As an example, suppose 20 MHZ channels 36, 40, 44, 48, 52, 56, 60, and 64 have scores of 0.8, 0.6, 0.9, 0.5, 0.7, 0.7, 0.3, 0.2, respectively; and alpha is set to 0.5. Then the score for the 160 MHZ channel is $$\max(0.8+0.5*(\min(0.8,0.6)-|0.8-0.6|)+0.25*(\min(0.8,0.6,0.9,0.5)-|\min(0.8,0.6)-\min(0.9,0.5)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.6+0.5*(\min(0.8,0.6)-|0.8-0.6|)+0.25*(\min(0.8,0.6,0.9,0.5)-|\min(0.8,0.6)-\min(0.9,0.5)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.9+0.5*(\min(0.9,0.5)-|0.9-0.5|)+0.25*(\min(0.8,0.6,0.9,0.5)-|\min(0.8,0.6)-\min(0.9,0.5)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.5+0.5*(\min(0.9,0.5)-|0.9-0.5|)+0.25*(\min(0.8,0.6,0.9,0.5)-|\min(0.8,0.6)-\min(0.9,0.5)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.7+0.5*(\min(0.7,0.7)-|0.7-0.7|)+0.25*(\min(0.7,0.7,0.3,0.2)-|\min(0.7,0.7)-\min(0.3,0.2)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.7+0.5*(\min(0.7,0.7)-|0.7-0.7|)+0.25*(\min(0.7,0.7,0.3,0.2)-|\min(0.7,0.7)-\min(0.3,0.2)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.3+0.5*(\min(0.3,0.2)-|0.3-0.2|)+0.25*(\min(0.7,0.7,0.3,0.2)-|\min(0.7,0.7)-\min(0.3,0.2)|)+0.125*(\min(0.8,0.6,0.9,0.5,0.7,0.7,0.3,0.2)-|\min(0.8,0.6,0.9,0.5)-\min(0.7,0.7,0.3,0.2)|),$$

$$0.2+0.5*(\min(0.3,0.2)-|0.3-0.2|)+0.25*(\min(0.7,0.7,0.3,0.2)-|\min(0.7,0.7)-\min(0.3,0.2)|)+0.125*(\min(0.8,0.6,0.9,0.5,0.7,0.7,0.3,0.2)-|\min(0.8,0.6,0.9,0.5)-\min(0.7,0.7,0.3,0.2)|))$$

$$=\max(1.09,0.89,1.04,0.64,0.96,0.96,0.26,0.16)=1.09.$$

Furthermore, the primary 20 MHz channel may be selected as channel 36 for this alternative as that combination gives the best score.

Passive scanning of dynamic frequency selection (DFS) channels by the access points may be fully compliant with IEEE 802.11 standards. However, switching to a DFS channel may incur connection loss due to a 1-minute channel availability check (CAC) time requirement. This connection loss may be avoided if the access points employ off-channel CAC where the access points scan channels for radar presence on a non-continuous manner while operating on another channel. Off-channel CAC allows the DFS channels to be marked as available if no radar presence is detected on the DFS channel for a certain period of time. Furthermore, the network may switch to a DFS channel without performing CAC if the DFS channel is marked as available by the off-channel CAC procedure. In one implementation where off-channel CAC is not implemented, the system to switch to a DFS channel with service interruption during CAC may be chosen, or disabling use of DFS channels may be chosen. In another implementation where off-channel scan can be carried out and radar can be detected with off-channel CAC, DFS channels may be used and switched without service interruption owing to off-channel radar detection capability. In another implementation, past radar presence on a given DFS channel may also be one of the channel quality metrics so that radar presence is also taken into account for calculating the channel scores.

Once all possible alternatives are evaluated, the alternatives may be sorted according to their scores is descending order. In one implementation, the cloud network controller may send the primary 20 MHz channel number and the bandwidth information of the channel with the highest score to the wireless mesh. In another implementation, the cloud network controller may send the first n alternatives (with the primary 20 MHz channel number and the bandwidth information) in the list to the wireless mesh (where n is determined by the network administrator). In implementation hysteresis may be applied and the scores of the current operating channel may be compared with the highest score alternative. If the improvement of the highest score alternative compared to the current operating channel of the wireless mesh is less than a given percentage, the operating channel may be pushed to the top of the list. The reason behind this is in some cases the mesh network not should not change the channel for marginal gains since channel switching may be costly and involve overhead.

Different weights/prioritization schemes between different types of channels, i.e. non-DFS low power, non-DFS high power, and DFS channels, may also be supported. In on implementation, the scores of each channel alternative may be multiplied with a coefficient that depends on the type of the channel. The coefficients may be specific to the channel type and may be the same for the channels belonging to the same category. These coefficients may be configurable on a mesh network basis and may be changed by the network administrator. In one example, non-DFS high power channels may have the highest coefficient, followed by DFS channels, followed by non-DFS low power channels to further differentiate the channels according to achievable throughput values. When a channel alternative spans multiple channel types such as channel 50 (160 MHz wide, spanning channels from 36 to 64), the lowest coefficient among the different channel types may be used.

Access points may be capable of observing the operating channel state by utilizing clear channel assessment (CCA) and energy detection (ED) mechanisms of IEEE 802.11 standard. An access point may continuously utilize CCA and ED to measure the time the channel is occupied by itself and other parties. Moreover, an access point can report the occupancy of the operating channel for a given time period; this period may be referred to as a measurement period as discussed herein. In one example, a measurement period may be one second.

In a wireless network that contains a single access point these measurements may be employed to check the current channel condition. If the access points belonging to other networks and other non-WiFi devices occupy the channel most of the time, the channel may be overcrowded and switching to another channel may provide better performance. On the other hand, if the access points belonging to other networks and other non-WiFi devices occupy the channel for a very brief time, the current channel may be satisfactory and there may be no need to perform channel switching. Also, switching to another channel may involve processing and time overhead due to scanning all other alternative channels to find the best of them, and switching the whole network to the best channel found.

Furthermore, the channel switching may also cause brief service interruptions in the wireless network. For instance, if the wireless network decides to switch to a dynamic frequency selection (DFS) channel, the access point should perform a 1-minute channel availability check (CAC) to detect any radar presence. During CAC time, the AP cannot provide service to the clients. The access point can only switch to the DFS channel once the CAC time is completed and no radar presence is detected during CAC. Considering the involved overhead, it is better to reduce the channel switches as much as possible and only switch if the current channel is not satisfactory.

In one scenario in a mesh network, such as that shown in FIG. 1, there may be traffic flow from client 1201 to client 1204 via the following path: client 1201 to AP 1101 to AP 1102 to client 1204. In this embodiment, the AP 1103 may classify this whole traffic flow as interference and may conclude that the current channel is not satisfactory. This may trigger a new channel selection and a subsequent channel switch, although most of the interference stems from the wireless mesh network's own traffic. Hence, it may be necessary for an access point belonging to a wireless mesh network to distinguish the interference of other networks from the traffic of other access points within the same wireless mesh in order to assess the interference level and quality of the current channel.

In one embodiment, the current interference level on the operating channel may be measured using one or more procedures. Each access point may measure the airtime its incoming and outgoing traffic takes on the channel. This airtime may be used by the access point in question. Hence, from the point of view of access point i the current activity on the operating channel during period t may be classified as: AP i's own transmission denoted by Xit; reception of traffic by AP i that is intended for AP i denoted by Yit; idle (no transmission/reception activity) denoted by Zit; and/or all other reception activity denoted by Uit, including WiFi activity of mesh peer access points, WiFi activity of access points of other networks, and non-WiFi activity.

As discussed herein, Xit, Yit, Zit and Uit values are percentages (i.e., percentage of time the corresponding activity is observed on channel by access point i during period t). If that is not the case and we have the actual time durations for each class, they can easily be converted into percentages by dividing the actual values by the length of the measurement period.

Each access point may continuously monitor the operating channel and store these Xit, Yit, Zit and Uit values in memory. Furthermore, each access point may send these values periodically to a master access point together with the timestamp indicating when the values are generated, which may be called a reporting period. In one implementation, the reporting period is set to a minute so that each access point sends the last 60 measurements to the master access point (i.e., a measurement for each second). The master access point may be an access point within the same wireless mesh. The master access point may also be selected using any method such as the lowest or highest medium access control (MAC) address, closeness to the gateway, and the like. The selection of the master access point may be selected in a number of ways and any suitable method could be used.

The access points of the wireless mesh network may be synchronized in time, and generate reports (Xit, Yit, Zit and Uit) for the same time period. Hence, the reports accumulated at the master access point from all access points may represent the same time periods. An example report accumulated at a master access point for a wireless mesh network with three access points is given in Table 1 where the t values are the timestamps in milliseconds corresponding to the end of the measurement period. To save space, only the last ten values in this example are provided, but depending on the reporting period, the length of the report may vary. The master access point may be any one of the access points. Please note that the values in the table are percentages, and for a given AP i and time t they sum up to approximately 100.

TABLE 1

An example of a report gathered at the master access point.

|  | AP1 | | | | AP2 | | | | AP3 | | | |
|---|---|---|---|---|---|---|---|---|---|---|---|---|
| t | X | Y | Z | U | X | Y | Z | U | X | Y | Z | U |
| 1484558282502 | 6 | 1 | 81 | 12 | 4 | 1 | 87 | 8 | 6 | 1 | 84 | 9 |
| 1484558283502 | 6 | 5 | 80 | 9 | 3 | 5 | 83 | 9 | 3 | 5 | 88 | 4 |
| 1484558284502 | 6 | 2 | 89 | 3 | 1 | 2 | 91 | 6 | 0 | 2 | 91 | 7 |
| 1484558285502 | 1 | 6 | 88 | 5 | 3 | 6 | 87 | 4 | 3 | 6 | 85 | 6 |
| 1484558286502 | 4 | 6 | 82 | 8 | 6 | 6 | 82 | 6 | 1 | 6 | 87 | 6 |
| 1484558287502 | 6 | 4 | 84 | 6 | 2 | 4 | 83 | 11 | 0 | 4 | 92 | 4 |
| 1484558288502 | 2 | 3 | 84 | 11 | 5 | 3 | 84 | 8 | 5 | 3 | 84 | 8 |
| 1484558289502 | 1 | 6 | 83 | 10 | 1 | 6 | 84 | 9 | 2 | 6 | 87 | 5 |
| 1484558290502 | 6 | 3 | 85 | 6 | 2 | 3 | 87 | 8 | 4 | 3 | 84 | 9 |
| 1484558291502 | 2 | 1 | 87 | 10 | 0 | 1 | 91 | 8 | 3 | 1 | 87 | 9 |

Figure 12:
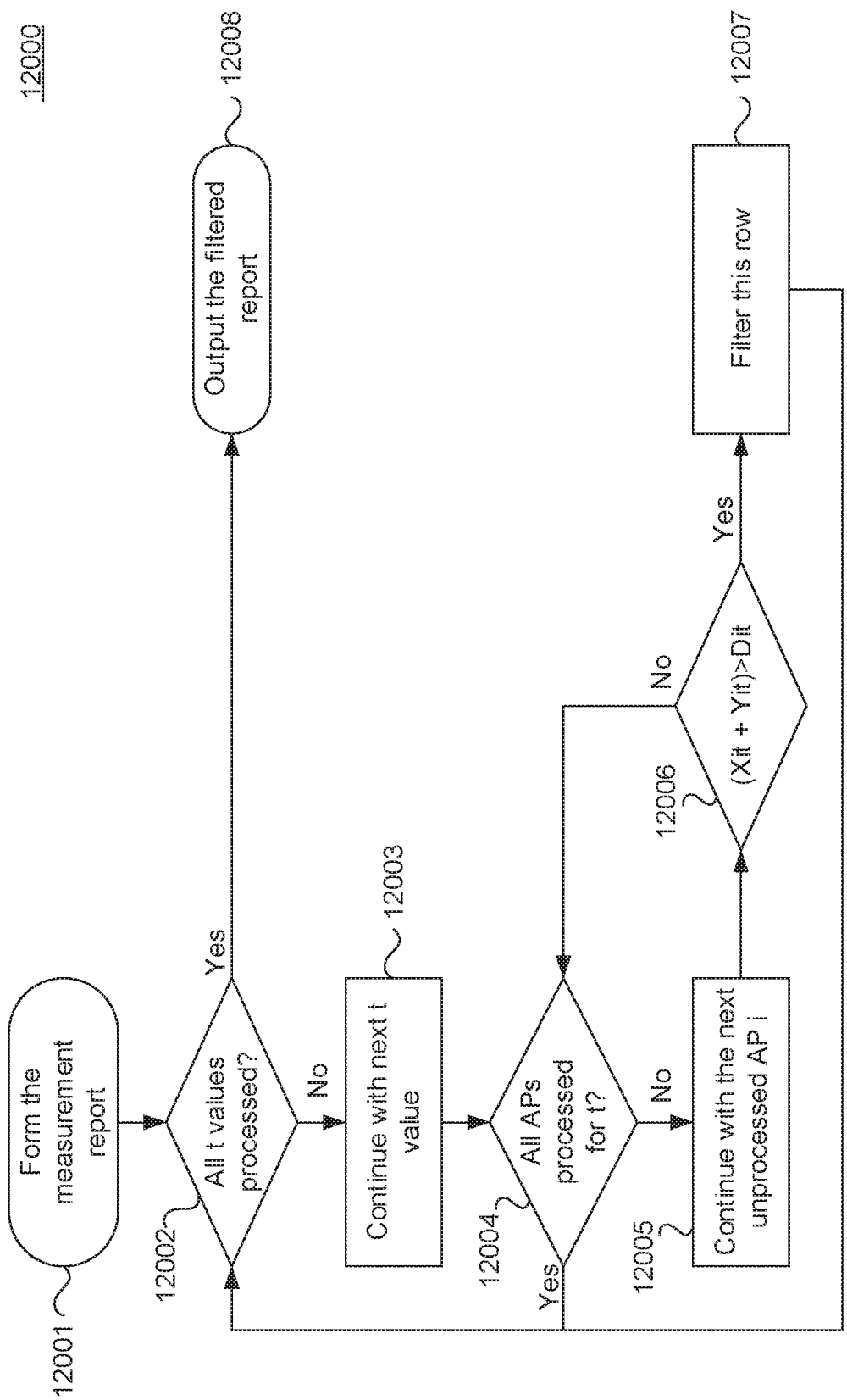
FIG. 12 is a flow chart of an example process for a master access point according to one or more embodiments.

Once the master access point gathers the report, it may eliminate some of the rows by executing the algorithm that is shown in FIG. 12. Initially, the master access point forms the measurement report by gathering the individual reports belonging to each access point 12001. The master access point may then check if all the t values in the report are processed 12002. If they are, then the algorithm may output the filtered report 12008. Otherwise, the algorithm may continue with the next t value (i.e., the next unprocessed row) 12003. Subsequently, the algorithm may check whether all access points are processed for the current t value 12004. If they are, the algorithm may go back to 12002. Otherwise, the algorithm may continue with the next unprocessed access point for the current t value 12005. The (Xit+Yit) value corresponding to the current time t and access point i may be checked with an access point and time dependent threshold Dit 12006. If (Xit+Yit) is greater than Dit, then the measurements corresponding to this row may be filtered out 12007, and the algorithm continues with 12002. Otherwise, the algorithm may continue with 12004.

At 12006, the algorithm may eliminate the rows where there is at least one mesh access point whose own traffic (Xit+Yit) exceeds the corresponding threshold. By doing so, the algorithm may minimize the cases where an access point's traffic may be observed as interference by other mesh access points. The selection of the threshold values Dit is crucial for this task, and may depend on many factors such as the number of clients connected to AP i at time t, time of the day, and the like. An exemplary embodiment of the invention uses a constant value of Dit=D=10 for all APs and measurement periods. Continuing with the sample data in Table 1, if Dit=D=10 value is used, the algorithm may output the data shown in Table 2.

TABLE 2

Example of filtered data.

|  | AP1 | | | | AP2 | | | | AP3 | | | |
|---|---|---|---|---|---|---|---|---|---|---|---|---|
| t | X | Y | Z | U | X | Y | Z | U | X | Y | Z | U |
| 1484558282502 | 6 | 1 | 81 | 12 | 4 | 1 | 87 | 8 | 6 | 1 | 84 | 9 |
| 1484558283502 | 6 | 2 | 89 | 3 | 1 | 2 | 91 | 6 | 0 | 2 | 91 | 7 |
| 1484558284502 | 1 | 6 | 88 | 5 | 3 | 6 | 87 | 4 | 3 | 6 | 85 | 6 |
| 1484558285502 | 2 | 3 | 84 | 11 | 5 | 3 | 84 | 8 | 5 | 3 | 84 | 8 |
| 1484558286502 | 1 | 6 | 83 | 10 | 1 | 6 | 84 | 9 | 2 | 6 | 87 | 5 |
| 1484558287502 | 6 | 3 | 85 | 6 | 2 | 3 | 87 | 8 | 4 | 3 | 84 | 9 |
| 1484558288502 | 2 | 1 | 87 | 10 | 0 | 1 | 91 | 8 | 3 | 1 | 87 | 9 |

Once the data is filtered, the interference and the quality of the channel may be evaluated. To achieve this, Uit values may be used to measure the interference observed by access point i during period t (lower interference may imply a better channel). In another case the (Xit+Yit+Zit) values may be used to measure the available transmission time on the channel observed by access point i during period t (higher available transmission time implies better channel). (Xit+Yit+Zit) includes the idle time and transmission from/to access point i. Hence, it gives the available transmission time from access point is point of view. In some embodiments, these values may be used assess the interference level on the channel. Where Uit values are discussed, Uit may be substituted for a value approximately equal to 100−(Xit+Yit+Zit).

After filtering, the outliers in the data may be eliminated on an access point basis. That is to say, Uit values that may be outlies are eliminated for each access point. This step is optional, and the process can operate without employing any outlier detection. An embodiment eliminates all Uit values that are more than k standard deviations away from the mean of Uit for access point i. Mathematically speaking, let $M''_i$ and $S''_i$ be the mean and standard deviation of Uit values belonging to access point i after filtering. Any Uit value that does not satisfy $(M''_i - k*S''_i) < Uit < (M''_i + k*S''_i)$ is considered an outlier and eliminated. An exemplary embodiment uses a k value of 2.

In one embodiment there may be quantiles for eliminating outliers. Uit values belonging to access point i may be divided into q quantiles. Any Uit value that is in the first or the last quantile may be considered an outlier and eliminated. In one example a q value of 4 may be used.

After the outlier elimination step, Uit values belonging to access point i may be averaged for each access point i. For averaging, any suitable averaging method may be used, such as the sample mean, exponential moving average, weighted average, and the like. In one case the sample mean may be used. As an example, sample mean of the data given in Table 2 is shown in Table 3.

TABLE 3

Example of average Uit values for each access point.

|  | AP1 | AP2 | AP3 |
|---|---|---|---|
| Sample mean | 8.14 | 7.29 | 7.57 |

Once the sample means are obtained for each access point, data of different access points may be aggregated to obtain a single interference score for the wireless mesh network. Any function suited to this task may be employed such as minimum, maximum, average, or the like. In one implementation the maximum of the averages of access points may be used, with the aim of concentrating on the access point with the worst interference. Once an interference score is obtained for the wireless mesh network, it may be compared with an interference threshold value in order to decide whether to continue to operate on the current channel or start the channel switching procedure. In one example, an interference threshold value of 10 may be used.

In one case, the measurements of the access points may not be perfectly synchronized in time, and there may be slight deviations across the access points. Additionally, the scheduler of the operating system may also cause slight deviations between the access points. In this case, each access point may have a different timestamp for each measurement. An example dataset with three access points for this scenario is shown in Table 4 where the t values are the timestamps in milliseconds corresponding to the end of the measurement period. To save space, only the last ten values are given for this example but depending on the reporting period, the length of the report may vary. The master access point may be any one of the access points. Please note that the values in the table are percentages, and for a given AP i and time t they sum up to approximately 100.

TABLE 4

Example report when the access points are not perfectly synchronized.

| AP1 | | | | | AP2 | | | | | AP3 | | | | |
|---|---|---|---|---|---|---|---|---|---|---|---|---|---|---|
| t | X | Y | Z | U | t | X | Y | Z | U | t | X | Y | Z | U |
| 1484558282502 | 6 | 1 | 81 | 12 | 1484558282524 | 4 | 1 | 87 | 8 | 1484558282538 | 6 | 1 | 84 | 9 |
| 1484558283502 | 6 | 5 | 80 | 9 | 1484558283524 | 3 | 5 | 83 | 9 | 1484558283538 | 3 | 5 | 88 | 4 |
| 1484558284502 | 6 | 2 | 89 | 3 | 1484558284524 | 1 | 2 | 91 | 6 | 1484558284538 | 0 | 2 | 91 | 7 |
| 1484558285502 | 1 | 6 | 88 | 5 | 1484558285524 | 3 | 6 | 87 | 4 | 1484558285538 | 3 | 6 | 85 | 6 |
| 1484558286502 | 4 | 6 | 82 | 8 | 1484558286524 | 6 | 6 | 82 | 6 | 1484558286538 | 1 | 6 | 87 | 6 |
| 1484558287502 | 6 | 4 | 84 | 6 | 1484558287524 | 2 | 4 | 83 | 11 | 1484558287538 | 0 | 4 | 92 | 4 |
| 1484558288502 | 2 | 3 | 84 | 11 | 1484558288524 | 5 | 3 | 84 | 8 | 1484558288538 | 5 | 3 | 84 | 8 |
| 1484558289502 | 1 | 6 | 83 | 10 | 1484558289524 | 1 | 6 | 84 | 9 | 1484558289538 | 2 | 6 | 87 | 5 |
| 1484558290502 | 6 | 3 | 85 | 6 | 1484558290524 | 2 | 3 | 87 | 8 | 1484558290538 | 4 | 3 | 84 | 9 |
| 1484558291502 | 2 | 1 | 87 | 10 | 1484558291524 | 0 | 1 | 91 | 8 | 1484558291538 | 3 | 1 | 87 | 9 |

Figure 13:
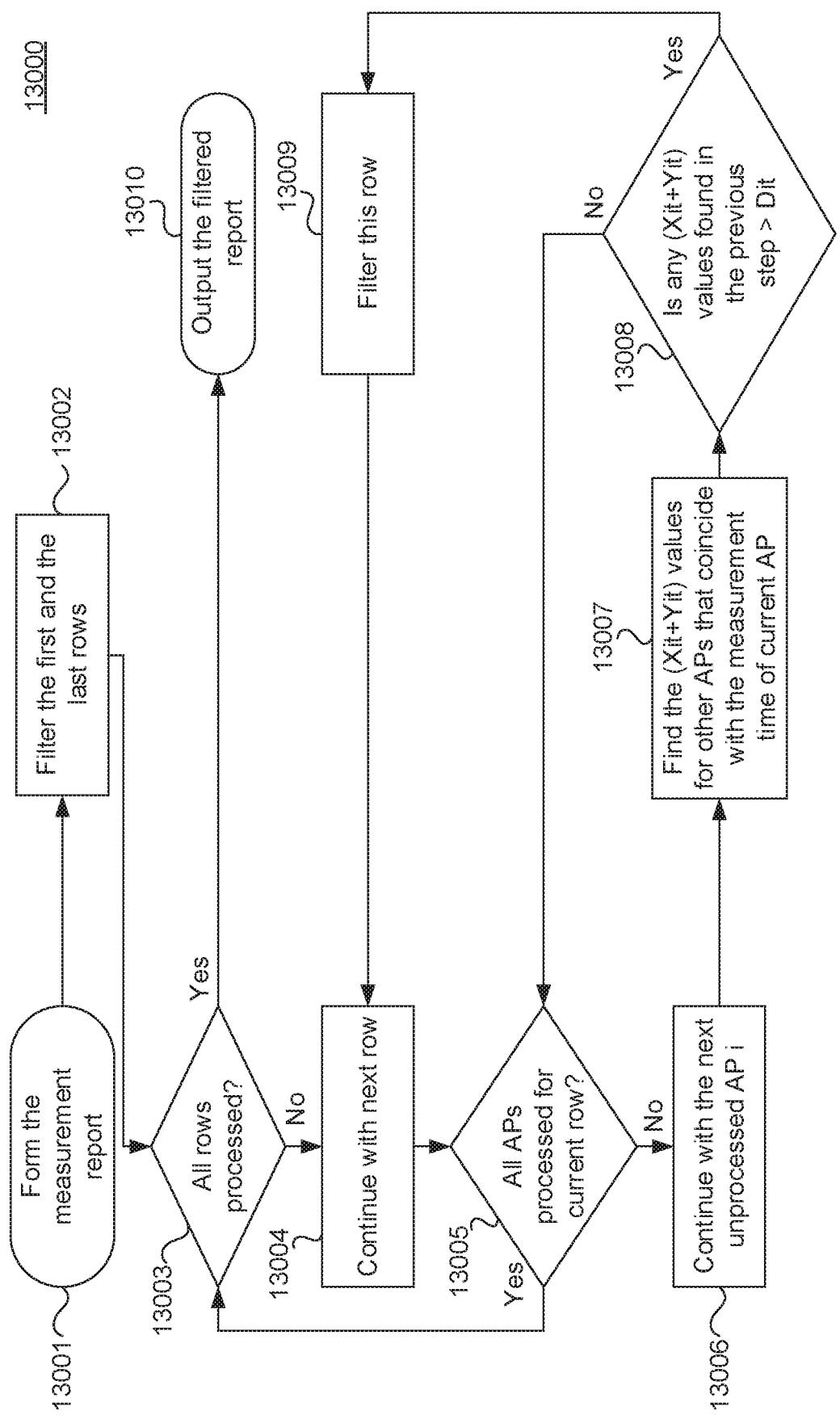
FIG. 13 is a flow chart of an example process for a master access point according to one or more embodiments.

FIG. 13 shows a flowchart 13000 of an example process where once the master access point gathers the report, it may filter some of the rows. Initially, the master access point forms the measurement report by gathering individual reports belonging to each access point 13001. The master access point may then filter the first and last row of the report 13002. After this step, the master access point may check if all the rows in the report are processed 13003. If that is the case, then master access point may output the filtered report 13010. Otherwise, the master access point may continue with the next row (i.e., the next unprocessed row) 13004. Subsequently, the master access point may check whether all access points are processed for the current t value 13005. If that is the case, the master access point may go back to 13003. Otherwise, the master access point may continue with the next unprocessed access point for the current row 13006. In the next step, (Xit+Yit) values of other access points whose measurement time coincides with the measurement time of the current access point may be obtained 13007. These (Xit+Yit) values may be compared with Dit 13008. If any (Xit+Yit) is greater than Dit, the current row may be filtered 13009, and the master access point may continue with the next row 13004. Otherwise, the master access point may continue to determine if all access points are processed for the current row 13005. For a given access point and measurement time, the measurements from other access points whose measurement time coincide with current measurement of the given access point may be found. If any of these found measurements have (Xit+Yit) greater than Dit, the whole set of measurements may be discarded.

Referring to the sample data given in Table 4, the measurement time of the second row of AP1 may coincide with the first and the second row of AP2, and the first and the second row of AP3. To elaborate, the second measurement of AP1 covers the time between 1484558283503 and 1484558284502 denoted as (1484558283503, 1484558284502). This time window coincides with the time windows of the first and second measurements of AP2 as the first measurement of AP2 covers the time (1484558281525, 1484558282524), and the second measurement of AP2 covers the time (1484558282525, 1484558283524). Hence, the second measurement of AP1 coincide with the first measurement of AP2 during (1484558282503, 1484558282524), and the second measurement of AP2 between (1484558282525, 1484558283502). Similarly, the second measurement of AP1 also coincides with the first and second row of AP3. For the sake of the example, it may be assumed that Dit=D=10. For AP2 and AP3, neither of these coinciding measurements may have (Xit+Yit)>10, so the process may continue to next AP for the second row, which is AP2. The measurement time of the second row of AP2 coincides with the second and third measurement of AP1, and the first and second measurement of AP3. This time, (Xit+Yit) of the second row of AP1 is (6+5=11)>10, so the second row of the report is filtered. Continuing in this manner, filtered data that is given in Table 5 may be obtained.

TABLE 5

Filtered data when the access points are not perfectly synchronized.

| AP1 | | | | | AP2 | | | | | AP3 | | | | |
|---|---|---|---|---|---|---|---|---|---|---|---|---|---|---|
| t | X | Y | Z | U | t | X | Y | Z | U | t | X | Y | Z | U |
| 1484558284502 | 6 | 2 | 89 | 3 | 1484558284524 | 1 | 2 | 91 | 6 | 1484558284538 | 0 | 2 | 91 | 7 |
| 1484558288502 | 2 | 3 | 84 | 11 | 1484558288524 | 5 | 3 | 84 | 8 | 1484558288538 | 5 | 3 | 84 | 8 |
| 1484558289502 | 1 | 6 | 83 | 10 | 1484558289524 | 1 | 6 | 84 | 9 | 1484558289538 | 2 | 6 | 87 | 5 |
| 1484558290502 | 6 | 3 | 85 | 6 | 1484558290524 | 2 | 3 | 87 | 8 | 1484558290538 | 4 | 3 | 84 | 9 |

After filtering, the outliers in the data may be eliminated on an access point basis. That is to say, for each access point, the Uit values that may be outlies are eliminated. This step may be optional, and the process may operate without employing any outlier detection. In one implementation all Uit values may be eliminated that are more than k standard deviations away from the mean of Uit for access point i. Mathematically speaking, $M''i$ and $S''i$ are the mean and standard deviation of Uit values belonging to access point i after filtering. Any Uit value that does not satisfy $(M''i-k*S''i)<Uit<(M''i+k*S''i)$ may be considered an outlier and eliminated. In one case a k value of 2 may be used.

In one implementation, the quantiles for eliminating the outliers may be used. Uit values belonging to access point i may be divided into q quantiles. Any Uit value that is in the first or the last quantile may be considered an outlier and eliminated. In one case a q value of 4 may be used.

After the outlier elimination step, Uit values belonging to access point i may be averaged for each access point i. For averaging, any suitable averaging method may be used, such as the simple average (sample mean), exponential moving average, weighted average, or the like. In one implementation a sample mean may be used. As an example, sample mean of the data given in Table 5 is shown in Table 6.

TABLE 6

Example of average Uit values for each access point

| | AP1 | AP2 | AP3 |
|---|---|---|---|
| Sample mean | 7.5 | 7.75 | 7.25 |

Once the sample means are obtained for each access point, the data of different access points may be aggregated to obtain a single interference score for the wireless mesh network. Any aggregation technique may be employed, such as minimum, maximum, average, or the like. In one implementation the maximum of the averages of access points may be used with the aim of concentrating on the access point with the worst interference. Once an interference score is obtained for the wireless mesh network, it may be compared with a threshold value in order to decide whether to continue to operate on the current channel or start the channel switching procedure. In one case a threshold value of 10 may be used.

In another implementation, an access point may use the MAC addresses of its mesh peer access points to differentiate the activity on the wireless channel. An access point has the MAC addresses of its mesh peer access points and may update this list when a new mesh access point is added or an existing mesh access point is removed. Using this list, an access point may classify the activity on the channel during period t into a number of categories.

In one instance for the transmission from an access point belonging to the mesh, a category 1 may be any wireless activity where the MAC header may be decoded and has one of the wireless mesh access points as the transmitter during period t. This category may be further classified into a separate category for each mesh access point, and denoted as $X_{ijt}$ meaning transmission by mesh access point j that is received by mesh access point i during period t. It should be mentioned that access point i may not be the intended receiver for the traffic, but just overhearing it. $X_{iit}$ denotes access point i's own transmission during period t.

In another instance for the transmission to an access point belonging to the mesh, a category 2 may be any wireless activity where the MAC header may be decoded and has one of the wireless mesh access points as the receiver during period t. This category may be further classified into a separate category for each mesh access point, and denoted as $Y_{ijt}$ meaning transmission to mesh access point j that is received/overheard by mesh access point i during period t. $Y_{iit}$ denotes the reception by access point i where access point i is also the intended receiver.

In another instance for other WiFi traffic, a category 3 may be any traffic during period t that can be identified as wireless traffic but is not from/to an access point i the wireless mesh, denoted as $W_{it}$.

In another instance for non-WiFi traffic and interference, a category 4 may be any other sources of traffic and interference during period t including non-decodable wireless traffic, denoted as $I_{it}$.

In another instance where there is no transmission or reception activity during period t may be category 5, denoted as $Z_{it}$.

Category 1 and category 2 may not be mutually exclusive. As an example, referring to FIG. 1, AP1101 may be sending a frame to AP1102. If AP1103 can decode the MAC header of this transmission, it may observe that AP1101 is the transmitter and AP1102 is the receiver. Hence, this traffic may be categorized into both category 1 and category 2. With this categorization, an access point may form the measurement report in much more detail. Moreover, the probability of assessing the traffic of other mesh access points as interference may be significantly reduced.

As discussed herein, $X_{ijt}$, $Y_{ijt}$, $W_{it}$, $I_{it}$ and $Z_{it}$ values may be percentages (i.e., percentage of time the corresponding activity is observed on channel by access point i during period t). If that is not the case and the actual time durations are known for each class, they may be converted into percentages by dividing the actual values by the length of the measurement period.

Each access point continuously monitors the operating channel and store these $X_{ijt}$, $Y_{ijt}$, $W_{it}$, $I_{it}$ and $Z_{it}$ values in memory. Furthermore, they send these values periodically to a master access point together with the timestamp indicating when the values are generated.

In one example, a report may be gathered at the master access point when the traffic is categorized and presented in Table 7 where the t values are the timestamps in milliseconds corresponding to the end of the measurement period. To save space, the last ten values are only given for this example but depending on the reporting period, the length of the report may vary. The master access point may be any one of the access points. Note that the values in the table are percentages, and for a given AP i and time t they sum up to approximately 100.

TABLE 7

Example report gather at an access point when the traffic is categorized

| AP1 | | | | | | | | | |
|---|---|---|---|---|---|---|---|---|---|
| t | X11t | X12t | X13t | Y11t | Y12t | Y13t | W1t | I1t | Z1t |
| 1484558282502 | 4 | 5 | 5 | 8 | 6 | 6 | 8 | 9 | 49 |
| 1484558283502 | 6 | 4 | 4 | 3 | 10 | 5 | 6 | 3 | 59 |
| 1484558284502 | 7 | 7 | 7 | 8 | 7 | 5 | 5 | 4 | 50 |
| 1484558285502 | 7 | 6 | 9 | 8 | 10 | 6 | 5 | 9 | 40 |
| 1484558286502 | 6 | 9 | 6 | 11 | 3 | 2 | 5 | 5 | 53 |
| 1484558287502 | 4 | 5 | 9 | 5 | 5 | 9 | 6 | 6 | 51 |
| 1484558288502 | 6 | 11 | 8 | 5 | 5 | 7 | 6 | 8 | 44 |
| 1484558289502 | 9 | 5 | 8 | 8 | 8 | 7 | 5 | 9 | 41 |
| 1484558290502 | 5 | 8 | 7 | 9 | 5 | 0 | 4 | 4 | 58 |
| 1484558291502 | 6 | 5 | 5 | 5 | 5 | 6 | 7 | 3 | 58 |
| AP2 | | | | | | | | | |
| t | X21t | X22t | X23t | Y21t | Y22t | Y23t | W2t | I2t | Z2t |
| 1484558282524 | 8 | 5 | 3 | 6 | 8 | 3 | 7 | 5 | 55 |
| 1484558283524 | 6 | 6 | 8 | 7 | 2 | 4 | 7 | 7 | 53 |
| 1484558284524 | 7 | 5 | 5 | 8 | 4 | 2 | 2 | 1 | 66 |
| 1484558285524 | 7 | 6 | 6 | 4 | 5 | 8 | 7 | 7 | 50 |
| 1484558286524 | 7 | 6 | 5 | 2 | 8 | 7 | 5 | 8 | 52 |
| 1484558287524 | 6 | 7 | 5 | 9 | 6 | 1 | 8 | 4 | 54 |
| 1484558288524 | 5 | 5 | 3 | 5 | 9 | 4 | 7 | 6 | 56 |
| 1484558289524 | 9 | 1 | 8 | 4 | 4 | 9 | 6 | 4 | 55 |
| 1484558290524 | 6 | 2 | 5 | 7 | 3 | 7 | 7 | 5 | 58 |
| 1484558291524 | 4 | 7 | 10 | 4 | 10 | 5 | 7 | 6 | 47 |

TABLE 7-continued

Example report gather at an access point when the traffic is categorized

| | AP3 | | | | | | | | |
|---|---|---|---|---|---|---|---|---|---|
| t | X31t | X32t | X33t | Y31t | Y32t | Y33t | W3t | I3t | Z3t |
| 1484558282538 | 2 | 6 | 6 | 5 | 3 | 4 | 3 | 9 | 62 |
| 1484558283538 | 9 | 5 | 6 | 7 | 4 | 2 | 7 | 8 | 52 |
| 1484558284538 | 6 | 6 | 5 | 5 | 4 | 8 | 6 | 6 | 54 |
| 1484558285538 | 6 | 3 | 6 | 7 | 6 | 11 | 5 | 4 | 52 |
| 1484558286538 | 6 | 6 | 3 | 6 | 7 | 5 | 5 | 8 | 54 |
| 1484558287538 | 5 | 5 | 4 | 5 | 9 | 7 | 5 | 4 | 56 |
| 1484558288538 | 6 | 8 | 8 | 4 | 6 | 6 | 5 | 5 | 52 |
| 1484558289538 | 6 | 3 | 2 | 7 | 5 | 5 | 4 | 10 | 58 |
| 1484558290538 | 7 | 6 | 6 | 12 | 5 | 6 | 8 | 6 | 44 |
| 1484558291538 | 6 | 9 | 6 | 8 | 2 | 7 | 6 | 6 | 50 |

For Table 7, X11t may denote the transmission of AP1 during period t; X12t may denote the transmission by AP2 that is received by AP1 during period t; Y13t may denote the transmission to AP3 that is received by AP1; W1t may denote the wireless traffic that is not related to the wireless mesh during period t; I1t may denote the non-WiFi traffic and interference received by AP1 during period t; and Z1t may denote the idle time that is observed by AP1 during period t.

Once the data is gathered at the master access point, the interference and the quality of the channel may be evaluated. The (Wit+Iit) values may be used to measure the total interference observed by access point i during period t (lower interference may imply a better channel). Alternatively/additionally the $(\Sigma_j Xijt + \Sigma_j Yijt + Zit)$ values may be used to measure the available transmission time on the channel (higher available transmission time may imply a better channel). The $(\Sigma_j Xijt + \Sigma_j Yijt + Zit)$ may include the idle time and transmission from/to access points of the wireless mesh. Hence, it may give the available transmission time of the wireless mesh from access point is point of view.

In one implementation working with the (Wit+Iit) values, these values may be used to assess the interference level on the channel. However, since (Wit+Iit) is approximately equal to $100 - (\Sigma_j Xijt + \Sigma_j Yijt + Zit)$, the methodology may be modified to work with $(\Sigma_j Xijt + \Sigma_j Yijt + Zit)$ values.

After gathering the individual reports at the master access point, the outliers in the data may be eliminated on an access point basis. That is to say, the (Iit+Wit) values that may be outliers are eliminated for each access point. This step may be optional and the process may operate without employing any outlier detection. In one implementation, all (Iit+Wit) values that are more than k standard deviations away from the mean of (Iit+Wit) for access point i may be eliminated. Mathematically speaking, let $M^{I+W}_i$ and $S^{I+W}_i$ be the mean and standard deviation of (Iit+Wit) values belonging to access point i. Any (Iit+Wit) value that does not satisfy $(M^{I+W}_i - k*S^{I+W}_i) < (Iit+Wit) < (M^{I+W}_i + k*S^{I+W}_i)$ may be considered an outlier and eliminated. In one example a k value of 2 may be used.

The quantiles may be used for eliminating the outliers. The (Iit+Wit) values belonging to access point i may be divided into q quantiles. Any (Iit+Wit) value that is in the first or the last quantile may be considered an outlier and eliminated. In one example a q value of 4 may be used.

After the outlier elimination step, (Iit+Wit) values belonging to access point i may be averaged for each access point i. For averaging, any suitable averaging method may be used, such as the sample mean, exponential moving average, weighted average, and the like. In one implementation, the sample mean may be used. As an example, sample mean of the data given in Table 7 is shown in Table 8.

TABLE 8

Example average (Iit + Wit) values for each access point.

| | AP1 | AP2 | AP3 |
|---|---|---|---|
| Sample mean | 11.7 | 11.6 | 12 |

Once the sample means are obtained for each access point, the data of different access points may be aggregated to obtain a single interference score for the wireless mesh network. Any technique may be employed such as the minimum, maximum, average, or the like. In one implementation, the maximum of the averages of access points is used with the aim of concentrating on the access point with the worst interference. Once an interference score is obtained for the wireless mesh network, it may be compared with a threshold value in order to decide whether to continue to operate on the current channel or start the channel switching procedure. In one example a threshold value of 10 may be used.

Figure 14:
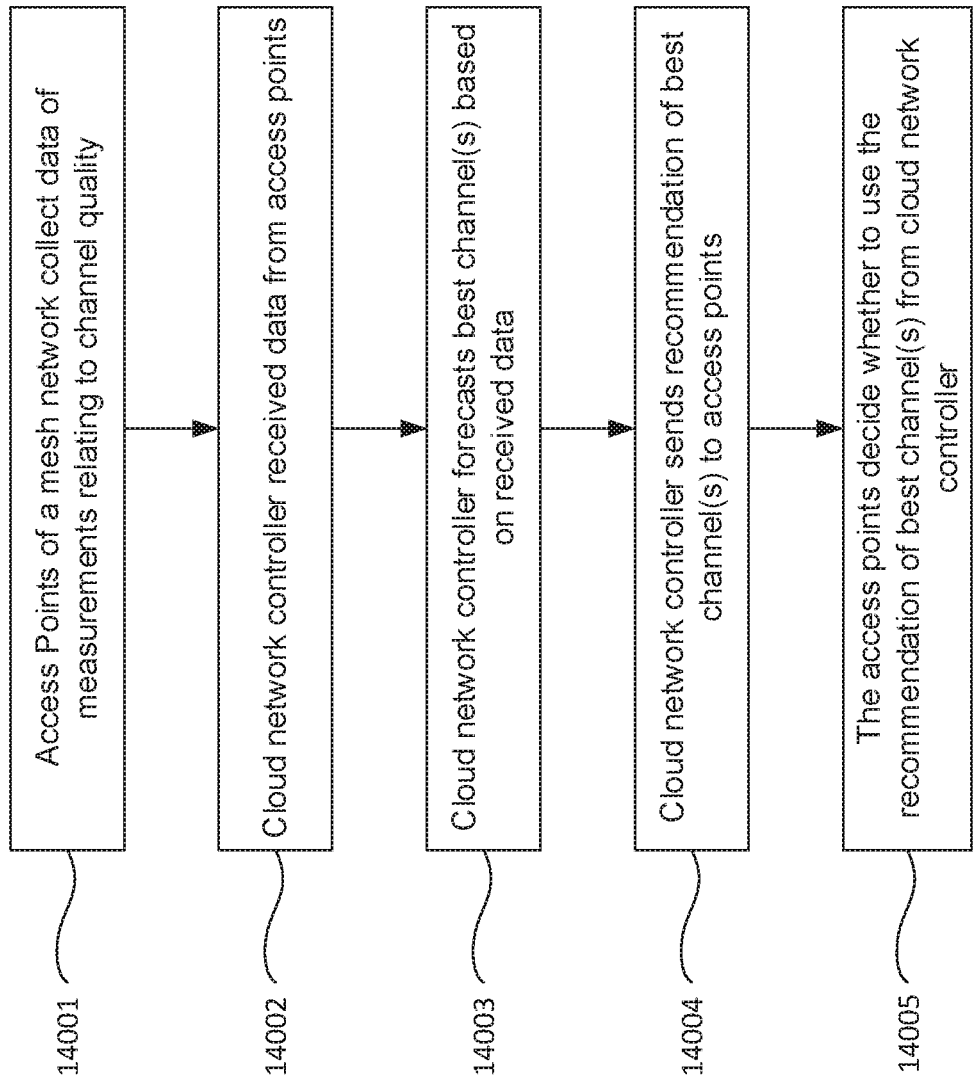
FIG. 14 is a flowchart of an example process of cloud controlled mesh networking.

FIG. 14 shows a flowchart of an example process of cloud based mesh network management. APs may collect data of measurements related to channel quality 14001 as discussed herein. A cloud network controller may receive this data from the APs 14002 and store it a database as discussed herein. The cloud network controller may then use this data to forecast the best channel or channels for the access points to operate in their mesh network 14003 as discussed herein. The cloud network may then send this recommendation to the access points 14004 as discussed herein. The access points may then decide to switch to this recommended channel or channels for operation of the mesh network 14005 as discussed herein.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in an access point, base station, or any other type of computing device.

What is claimed is:

1. A method for optimizing a wireless mesh network of multiple access points (APs), the method comprising:
   receiving, from the multiple APs in the wireless mesh network, information regarding channel quality for each channel of a plurality of channels, wherein the plurality of channels comprises 802.11 wireless local area network (WLAN) channels, and wherein the channel quality for each channel of the plurality of channels is measured simultaneously by the multiple APs, wherein the information regarding channel quality comprises traffic information that has been categorized into a plurality of categories, wherein the categorization is based in part on examining medium access control, MAC, headers of the traffic information;
   forecasting a future state of the plurality of channels based on the information regarding channel quality, wherein the forecasting is based in part on a subset of categories of the plurality of categories of traffic information;
   selecting one or more optimal channels based on the forecasting, wherein the one or more optimal channels are selected from the plurality of channels; and
   sending, to the multiple APs, a message including a recommendation to switch to the one or more optimal channels in order to optimize the wireless mesh network.

2. The method of claim 1, wherein the information regarding channel quality is indicative of a measurement of airtime availability performed for each channel of the plurality of channels according to a time schedule such that each measurement is synchronized in time by each of the multiple mesh APs.

3. The method of claim 1, wherein the forecasting further comprises selecting a channel of the plurality of channels that is unprocessed and processing the channel by aggregating the information regarding channel quality for the channel over a time period from at least one AP of the multiple APs.

4. The method of claim 3, further comprising repeating the processing for all of the plurality of channels that are unprocessed until no channels of the plurality of channels are unprocessed, wherein the one or more optimal channels are only selected from all channels of the plurality of channels that are processed.

5. The method of claim 1, further comprising:
   selecting, prior to the forecasting, a best forecasting method from a plurality of forecasting methods.

6. The method of claim 1, wherein a first category of the subset of categories relates to traffic that is not from or to any of the multiple mesh APs.

7. The method of claim 1, wherein a second category of the subset of categories relates to traffic information that is not related to WiFi.

8. A cloud network controller for optimizing a wireless mesh network of multiple Access Points (APs), the network controller comprising:
   a database;
   a communications interface,
   a processor operatively connected to the communications interface and the database, the processor and communications interface configured to receive from the multiple APs in the wireless mesh network information regarding channel quality for each channel of a plurality of channels, and to store the information related to channel quality in the database, wherein the plurality of channels comprises 802.11 wireless local area network (WLAN) channels, and wherein the channel quality for each channel of the plurality of channels is measured simultaneously by the multiple APs, wherein the information regarding channel quality comprises traffic information that has been categorized into a plurality of categories, wherein the categorization is based in part on examining medium access control, MAC, headers of the traffic information;
   the processor further configured to forecast a future state of the plurality of channels based on the information regarding channel quality, wherein the forecasting is based in part on a subset of categories of the plurality of categories of traffic information;
   the processor further configured to select one or more optimal channels based on the forecasting, wherein the one or more optimal channels are selected from the plurality of channels; and
   the processor and communications interface further configured to send to the multiple APs, a message including a recommendation to switch to the one or more optimal channels in order to optimize the wireless mesh network.

9. The cloud network controller of claim 8, wherein the information regarding channel quality is a measurement of airtime availability performed for each channel of the plurality of channels according to a time schedule such that each measurement is synchronized in time by each of the multiple mesh APs.

10. The cloud network controller of claim 9, wherein the forecasting performed by the processor further requires the processor to select a channel of the plurality of channels that is unprocessed and processing the channel by aggregating the information regarding channel quality for the channel over a time period from at least one AP of the multiple APs.

11. The cloud network controller of claim 10, wherein the forecasting performed by the processor further requires the processor to repeat the processing for all of the plurality of channels that are unprocessed until no channel of the plurality of channels is unprocessed, wherein the one or more optimal channels are only selected from all channels of the plurality of channels that are processed.

12. The cloud network controller of claim 8, wherein the processor is further configured to:
   select, prior to forecasting, a best forecasting method from a plurality of forecasting methods.

13. The cloud network controller of claim 8, wherein a first category of the subset of categories relates to traffic that is not from or to any of the multiple mesh APs.

14. The cloud network controller of claim 8, wherein a second category of the subset of categories relates to traffic information that is not related to WiFi.

* * * * *